United States Patent [19]
Prokai et al.

[11] 3,887,500
[45] June 3, 1975

[54] ORGANOSILICONE POLYMERS

[75] Inventors: Bela Prokai, Mahopac; Bernard Kanner, West Nyack, both of N.Y.

[73] Assignee: Union Carbide Corporation, New York, N.Y.

[22] Filed: Nov. 29, 1973

[21] Appl. No.: 420,233

Related U.S. Application Data

[62] Division of Ser. No. 279,883, Aug. 11, 1972, Pat. No. 3,846,402.

[52] U.S. Cl. .................................... 260/2.5 AH; 260/33.4 SB; 260/33.4 UR
[51] Int. Cl. ............................................ C08g 22/44
[58] Field of Search ................. 260/2.5 AH, 2.5 BD

[56]                 References Cited
            UNITED STATES PATENTS

| | | | |
|---|---|---|---|
| 3,637,783 | 1/1972 | Haluska | 260/2.5 AH X |
| 3,793,300 | 2/1974 | Prokai et al. | 260/2.5 AH |
| 3,796,676 | 3/1974 | Kroner et al. | 260/2.5 AH |

*Primary Examiner*—Lewis T. Jacobs
*Attorney, Agent, or Firm*—M. Klosty

[57]              ABSTRACT

Organosilicone polymers are provided which comprise polysiloxane-polyoxyalkylene block copolymers wherein the polysiloxane blocks are trialkylsiloxy-endblocked and contain reoccurring difunctional dialkylsiloxy monomeric units in combination with reoccurring difunctional cyanoalkyl-alkylsiloxy or cyanoalkoxyalkylsiloxy monomeric units, the mol ratio of the dialkylsiloxy units to the cyano-substituted siloxy units being about 10–200:3–100, and wherein the polysiloxane and polyoxyalkylene blocks are joined through an Si—C or an Si—O—C linkage, and from about 20 to about 65 weight per cent of the oxyalkylene units of the polyoxyalkylene blocks are constituted of oxyethylene units. The block copolymers of the invention are effective stabilizers of flexible polyether polyolbased polyurethane foams and offer particular advantage in the formation of flame-retarded foams. Also provided is a particular class of cyano-substituted polyalkylsiloxane hydrides which are useful in the preparation of the aforesaid block copolymers.

9 Claims, No Drawings

ORGANOSILICONE POLYMERS

This is a division of application Ser. No. 279,883 filed Aug. 11, 1972, now U.S. Pat. No. 3,846,462, issued Nov. 5, 1974.

BACKGROUND OF THE INVENTION

The present invention relates to novel organosilicone polymers and their use in the manufacture of urethane cellular products, particularly flame-retarded flexible polyether polyol-based urethane foams.

It is well known that the urethane linkages of urethane foams are formed by the exothermic reaction of a polyfunctional isocyanate and a polyfunctional active hydrogen-containing compound in the presence of a catalyst, and that the cellular structure of the foam is provided by gas evolution and expansion during the urethane-forming reaction. In accordance with the "one-shot process" which is the most widely used industrial technique, direct reaction is effected between all of the raw materials which include the polyisocyanate, the active hydrogen-containing compound, the catalyst system, blowing agent and surfactant. A major function of the surfactant is to stabilize the urethane foam, that is, prevent collapse of the foam until the foamed product has developed sufficient gel strength to become self-supporting.

It is also well known that suitable active hydrogen-containing compounds include polyether polyols and polyester polyols. From the standpoint of their chemical structure, therefore, urethanes are usually classified as polyether and polyester urethanes, respectively. Urethane foams also differ with respect to their physical structure and, from this standpoint, are generally classified as flexible, semi-flexible or rigid foams.

Although certain techniques of urethane manufacture such as the one-shot process and certain components of the foam formulation such as the polyisocyanates, amine catalyst and blowing agent, are generally useful, a specific problem associated with the production of a particular type of urethane foam and the solution thereto are often peculiar to the chemical and physical structure of the desired foamed product. In particular, the efficacy of the foam stabilizer is usually selective with respect to the formation of a particular type of foam. One factor to be considered in the evaluation of stabilizing efficacy is surfactant potency which is reflected by two types of measurements. One is the measured original height to which the foam rises as it is being formed. From this standpoint, the greater the foam rise, the more potent is the surfactant. The second potency measurement is concerned with the ability of the surfactant to maintain the original height of the foam once it has formed. Foams produced with surfactants which have goot potency in this second respect undergo a minimum of settling or "top collapse" which may otherwise contribute to split formation and other foam defects.

It is also desirable that the foam stabilizer have good processing latitude, that is, ability to provide foams of satisfactory quality over a relatively wide range of operating variables such as, for example, concentration of surfactant and metal co-catalysts which are normally employed in the manufacture of flexible polyether-based foams. The more common co-catalysts are organic derivatives of tin and thus sensitivity to variation in co-catalyst concentration is more particularly referred to in the art as "tin operating latitude." Decreasing the concentration of such co-catalysts below normal levels is sometimes necessary to improve breathability of the foam but, if the effectiveness of the foam stabilizer is narrowly dependent on co-catalyst concentration (that is, its tin operating latitude is poor), the desired enhanced breathability will be offset by foam weakness due to split formation.

The search for improved surfactants for stabilization of polyurethane foams is further complicated by the tendency of such foams to ignite readily and burn and the need to reduce their flammability. This characteristic is particularly objectionable in the case of flexible polyurethane foams in view of the use of such foams in many applications where fire is especially hazardous such as their use in automotive seat cushions and household furniture cushioning. One approach to reducing flammability of flexible foams is to include a flame-retarding agent such as various phosphorus and/or halogen-containing compounds as a component of the foam-producing reaction mixture. It is found, however, that surfactants which may otherwise be effective stabilizers of non flame-retarded foams, may be deficient as stabilizers of flame-retarded foams.

Among the various types of surfactants which have been used to advantage for stabilization of non flame-retarded flexible polyether-based urethane foams are polyoxyalkylene-polysiloxane block copolymers wherein silicon of the siloxane backbone is bonded only to methyl groups and the polyether portion of the polyoxyalkylene blocks is composed of oxyethylene and oxypropylene units. Such copolymers include those of both the hydrolyzable and non hydrolyzable types, that is, copolymers in which the polysiloxane and polyoxyalkylene blocks are linked through —Si—O—C— and —Si—C— bonds, respectively. From the standpoint of possessing a particularly good combination of potency and processing latitude in the stabilization of flexible polyether urethane foams, an especially useful class of non hydrolyzable block copolymers are those described in U.S. Pat. No. 3,505,377, an application for reissue of which was filed on Nov. 18, 1971 as Ser. No. 200,242 of Edward L. Morehouse, now U.S. Pat. No. Re. 27,541. When used to stabilize polyether-based foams derived from reaction mixtures containing a flame-retardant, however, copolymers wherein the polysiloxane blocks are substituted only with methyl groups including copolymers of the hydrolyzable type, provide foams which either do not qualify as self-extinguishing (by flammability test ASTM D-1692-68) or do not provide self-extinguishing foams of low burning extent.

The prior art also describes polysiloxane-polyoxyalkylene block copolymers wherein the backbone of the polysiloxane blocks are modified with various groups other than or in addition to methyl groups, such as aralkyl groups. Copolymers of this type are described in U.S. Pat. No. 3,657,305 and in copending application Ser. No. 888,067, filed Dec. 24, 1969, of Edward L. Morehouse, now U.S. Pat. No. 3,686,254. Although such copolymers, and especially those containing phenylethyl groups bonded to silicon, provide flame-retarded foams of significantly reduced flammability, it has been found such foams have a tendency to settle leaving room for still further improved organosilicone foam stabilizers.

3

It is an object of this invention to provide new and useful organosilicone polymers which have particular application in the manufacture of flexible polyether polyol-based polyurethane foams.

Another object is to provide an improved class of polysiloxane-polyoxyalkylene block copolymers which possess a good combination of properties such as potency and processing latitude when used as stabilizers of flexible polyether urethane foams and which additionally allow for the formation of self-extinguishing foams of low burning extent and good quality with minimum sacrifice in their aforementioned other desirable properties.

A further object is to provide particular flexible polyether polyurethane foams of reduced flammability and a method for their manufacture.

Various other objects and advantages of this invention will become apparent to those skilled in the art from the accompanying description and disclosure.

SUMMARY OF THE INVENTION

In accordance with one aspect of the present invention a novel class of cyano-substituted organosilicones is provided comprising polymers having the average structure depicted by the following Formula I:

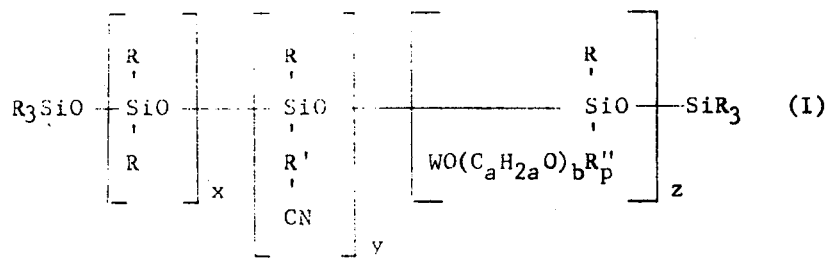

wherein:
R represents an alkyl group having from 1 to 10 carbon atoms;

R' represents a bivalent alkylene group (—R°—) or an oxyalkylene group (—OR°—) the oxygen atom of which is bonded to silicon, said R° group having at least 2 and usually no more than 12 carbon atoms;

R'' represents a bivalent alkylene group, an —alkylene—CO— or an —alkylene—NHCO— group where in each instance the free valence of alkylene is bonded to silicon;

W represents a monovalent hydrocarbyl group ($R^{\infty}$—), an acyl group [$R^{\infty}C(O)$—], or a carbamyl group [$R^{\infty}NHC(O)$—], wherein $R^{\infty}$— in each instance has from 1 to 12 carbon atoms;

$x$ has an average value of from about 10 to about 200, and more usually has a value of from about 20 to about 100;

$y$ has an average value of from about 3 up to about 100, and is usually at least about 4 and no more than about 30;

4

$z$ has an average value of from 2 to 30, and is usually no more than about 10;

$p$ is either zero or one;

$a$ has a value of from 2 to 4 provided from about 20 to about 65 weight per cent of the oxyalkylene units of the polyoxyalkylene chain, —$(C_aH_{2a}O)_b$—, is constituted of oxyethylene units; and $b$ has an average value such that the average molecular weight of the polyoxyalkylene chain is from about 1000 to about 6000.

In addition to the aforesaid novel class of organosilicone polymers, the present invention also provides a process for producing flexible polyurethane foam which comprises reacting and foaming a reaction mixture of: (a) a polyether polyol reactant containing an average of at least two hydroxyl groups per molecule; (b) a polyisocyanate reactant containing at least two isocyanato groups per molecule; (c) a blowing agent; (d) a catalyst comprising an amine; (e) a co-catalyst comprising an organic derivative of a polyvalent metal such as tin; and (f) a foam stabilizer comprising the cyano-substituted organosilicone polymers represented by Formula I above. In addition to their efficacy as stabilizers of polyether-based urethane foams, it has been found that the organosilicone polymers of this invention possess the further advantageous property of allowing for the formation of flame-retarded foams of acceptable overall quality without substantial sacrifice of their good combination of potency and processing latitude. In accordance with this aspect of the present invention, flame-retarded flexible polyether-based urethane foams are provided by reacting and foaming reaction mixtures which also include a silicon-free, flame-retarding agent.

In providing either the non flame-retarded or flame-retarded foams of the invention, the organo-silicone polymers encompassed by Formula I can be introduced to the foam-producing reaction mixtures either as such, in diluted form, or preblended with one or more of the polyether polyol reactant, blowing agent, amine catalyst or flame-retarding agent.

The present invention also relates to various methods for the preparation of the novel foam stabilizers described herein including the reaction of: (1) polyoxyalkylene reactants which are either hydroxyl-terminated or end-blocked at one end with an olefinically unsaturated group, and (2) the novel class of cyano-substituted polyhydrocarbylsiloxane hydrides having the average structure represented by the following general Formula II:

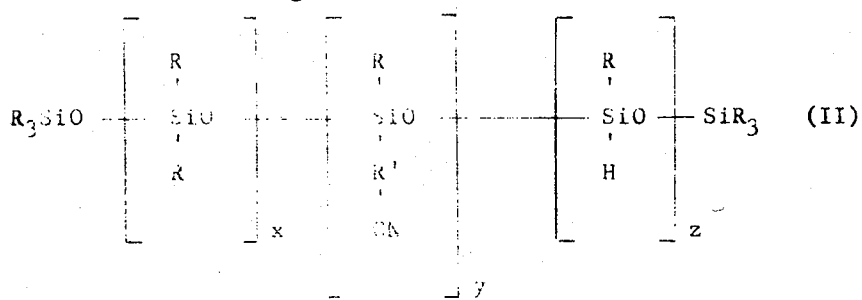

wherein,
R, R', $x$, $y$, and $z$ have the aforesaid significance defined with respect to Formula I.

DESCRIPTION OF THE PREFERRED EMBODIMENTS

The organosilicone polymer surfactants of this invention are, as depicted by Formula I, polysiloxane-polyoxyalkylene block copolymers wherein the polysiloxane and polyoxyalkylene blocks are linked through a silicon-to-carbon bond (when $p$ has a value of one) or through a silicon-to-oxygen bond (when $p$ is zero), as shown by the following more specific structures, respectively:

wherein
R, R', W, $x$, $y$, $z$, $a$ and $b$ are as defined with respect to Formula I.

From the standpoint of the nature of the linkage by which the polysiloxane and polyoxyalkylene blocks are joined, the copolymers of Formula I-A are of the non hydrolyzable type whereas those of Formula I-B are hydrolyzable. Although the alkyl groups represented by R are bonded to silicon through Si—C linkages, the cyano-substituted groups depicted as —R'CN, may be bonded to silicon through either a silicon-to-carbon bond (when R' is an alkylene group, —R°—) or a silicon-to-oxygen bond (when R' is an oxyalkylene group, -OR°-) as shown by the following formulas, respectively:

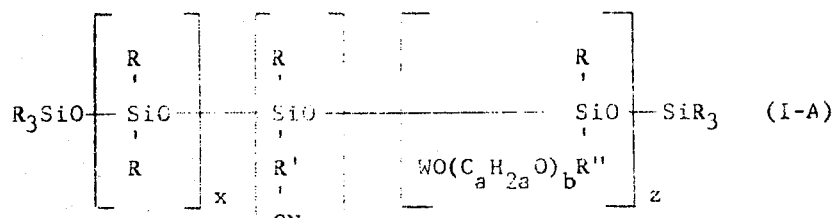

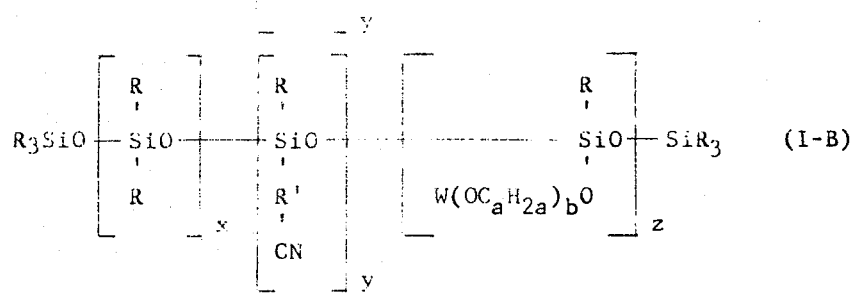

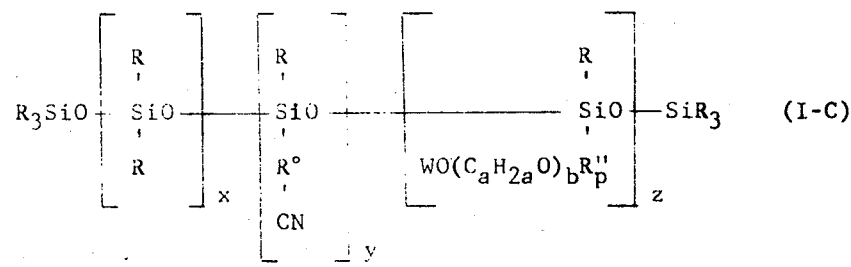

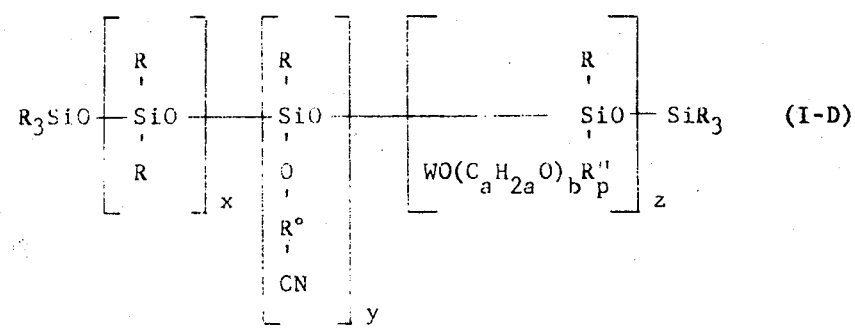

wherein

R, R°, W, $x$, $y$, $z$, $a$, $b$, and $p$ are as defined with respect to Formula I.

Thus, the organosilicone polymers of the invention may be: (1) non hydrolyzable with respect to both the polyoxyalkylene block and cyano-substituted groups (when $p$ of Formula I-C is one); (2) hydrolyzable with respect to both the polyoxyalkylene block and cyano-substituted groups (when $p$ of Formula I-D is zero); (3) hydrolyzable with respect to the polyoxyalkylene block and non hydrolyzable with respect to the cyano-substituted groups (when $p$ of Formula I-C is zero); and (4) non hydrolyzable with respect to the polyoxyalkylene block and hydrolyzable with respect to the cyano-substituted groups (when $p$ of Formula I-D is one).

In the silicon-bonded, cyano-substituted —R°CN and —OR°CN groups, R° represents a bivalent alkylene radical including linear and branched radicals of the series, $-C_cH_{2c}-$, where $c$ has a value of from 2 to 12 and is preferably not more than six. Illustrative of suitable groups represented by R° are: ethylene ($-CH_2CH_2-$); trimethylene ($-CH_2CH_2CH_2-$); propylene [$-CH_2CH(CH_3)-$]; tetramethylene and higher homologues to dodecamethylene [$-(CH_2)_{12}-$]. The —R°— groups are usually lower alkylene groups having from two to four carbon atoms. It is to be understood that the —R°— groups may be the same throughout the polymer or they may differ and that the polymer may contain any combination of cyanoalkyl— (NC—R°—) and cyanoalkoxy— (NC—R°O—) substituted siloxy units.

The remaining silicon-bonded groups (R) which comprise the polysiloxane backbone of the block copolymers of this invention, are alkyl groups of the series, $C_dH_{2d+1}-$, wherein $d$ has a value from 1 to 10, including linear and branched alkyl groups. Illustrative of suitable groups encompassed by R are: methyl, ethyl, n-propyl, isopropyl, n-butyl, t-butyl, pentyl, hexyl, oxtyl and decyl groups. Of the various groups represented by R, the lower alkyl groups (that is, those having from one to four carbon atoms) are preferred of which methyl is especially suitable. It is to be understood that the R groups may be the same throughout the polymer or they may differ as between or within units without departing from the scope of this invention. For example, the endblocking monofunctional units, $R_3SiO_{1/2}-$, may be trimethylsiloxy units and the difunctional units, $R_2SiO$, may be diethylsiloxy or methylethylsiloxy units.

The average polysiloxane content of the block copolymers of this invention ranges between about 15 and about 45 weight per cent of the total weight of the polymer, the remainder being constituted essentially of the polyoxyalkylene blocks which are shown in general Formula I as $WO(C_aH_{2a}O)_b-$. In the compositions wherein the polysiloxane and polyoxyalkylene blocks are linked through a silicon-to-carbon bond (that is, the specific compositions encompassed by Formula I-A), the linking group (R″) is a bivalent alkylene group, an —alkylene—C(O)— group or an —alkylene—NH—C(O)— group wherein the free valence of alkylene is bonded to silicon. In these linking groups, alkylene has the more specific formula $-C_eH_{2e}-$, where $e$ has a value from 2 to 6 and is usually no more than four. Illustrative of suitable groups encompassed by R″ are: ethylene; trimethylene; propylene, tetramethylene; hexamethylene; corresponding $-C_eH_{2e}-C(O)-$ groups which together with oxygen of the polyoxyalkylene chain form an ester linkage; and corresponding $-C_eH_{2e}-NHC(O)-$ groups which in combination with oxygen of the polyoxyalkylene chain form carbamate linkages.

The average molecular weight of the polyoxyalkylene chain, $-(C_aH_{2a}O)_b-$, ranges from about 1000 to about 6000 and from about 20 to about 65 weight per cent thereof is constituted of oxyethylene units. The remainder of the polyoxyalkylene chain is usually formed of oxypropylene, oxybutylene or a combination of such units, although preferably the remainder is oxypropylene. It is to be understood that the oxyethylene and other oxyalkylene units can be randomly distributed throughout the polyoxyalkylene chain or they can be grouped in respective sub-blocks, provided the total average content of $-(C_2H_4O)-$ in the chain is within the aforesaid said range. The preferred polyoxyalkylene blocks have the formula, $WO(C_3H_6O)_m(C_2H_4O)_n-$ wherein $m$ has an average value of from about 6 to about 82 and $n$ has an average value from about 4.5 to about 90, provided the average molecular weight of the chain, $-(C_3H_6O)_m(C_2H_4O)_n-$, is within the aforesaid range of 1000 to 6000, and from 20 to 65 weight per cent of the chain is constituted of oxyethylene units.

As further indicated by the above Formula I the polyoxyalkylene chain, $-(C_aH_{2a}O)_b-$, is terminated by the organic group, WO—, wherein W is a monovalent organic capping group. Illustrative of the organic caps encompassed by W are such groups as: R∞—, R∞NHC(O)—, and R∞C(O)—, wherein R∞ is a monovalent hydrocarbon radical having from 1 to 12 carbon atoms, and is usually free of aliphatic unsaturation. The groups (WO—) which endblock the polyoxyalkylene chains are, therefore, corresponding R∞O—, R∞NHC(O)O— and R∞C(O)O— monovalent organic radicals. In the aforesaid capping (W) and terminal (WO—) groups, R∞ can be any of the following: an alkyl group including linear and branched chain alkyl groups having the formula, $C_fH_{2f+1}-$, wherein $f$ is an integer from 1 to 12, such as, for example, methyl, ethyl, n-propyl, isopropyl, n-butyl, t-butyl, octyl and dodecyl groups; a cycloaliphatic radical including monocyclic and bicyclic groups such as, for example, cyclopentyl, cyclohexyl and bicyclo[2.2.1]heptyl groups; an aromatically unsaturated group including aryl, alkaryl and aralkyl radicals such as, for example, phenyl, naphthyl, xylyl, tolyl, cumenyl, mesityl, t-butylphenyl, benzyl, beta-phenylethyl and 2-phenylpropyl groups; alkyl- and aryl- substituted cycloaliphatic radicals such as, for example, methylcyclopentyl and phenylcyclohexyl radicals; and the like. It is evident, therefore, that the terminal group (WO—) of the polyoxyalkylene chain can be corresponding alkoxy, aryloxy, aralkoxy, alkaryloxy, cycloalkoxy, acyloxy, aryl—C(O)O—, alkyl carbamate and aryl carbamate groups.

The generally preferred R∞ groups are phenyl, lower alkyl radicals, the lower alkyl-substituted aryl groups and the aryl-substituted lower alkyl groups, wherein the term "lower alkyl" denoted $C_1$–$C_4$ alkyl radicals. Therefore, illustrative of the preferred capping groups represented by W of Formula I are: methyl, ethyl, propyl, butyl, phenyl, benzyl, phenylethyl ($C_6H_5-C_2H_4-$), acetyl, benzoyl, methylcarbamyl [$CH_3NHC(O)-$], ethylcarbamyl [$C_2H_5NHC(O)-$], propyl- and butyl-carbamyl groups, phenylcarbamyl [$C_6H_5NHC(O)-$], tolylcarbamyl

[(CH$_3$)$_2$C$_6$H$_3$NHC(O)—], benzylcarbamyl [C$_6$H$_5$CH$_2$NHC(O)—], and the like.

It is to be understood that the terminal organic radical (WO—) of the respective polyoxyalkylene blocks of the polymers of this invention may be the same throughout the polymer or may differ. For example, the polymer compositions of this invention can contain polyether blocks in which the terminal group (WO—) is methoxy, and other polyether groups in which WO— is a hydrocarbyl-carbamate group such as methylcarbamate, CH$_3$NHC(O)O—, or benzyloxy (C$_6$H$_5$CH$_2$O—).

Preferred organosilicone polymers of this invention are those encompassed by the following Formulas III–VI:

and the average molecular weight of the chain is from about 1000 to about 6000.

Generally, block copolymers encompassed by Formulas III-VI have a particularly good combination of potency, processing latitude including tin operating latitude and allow for the formation of flame-retarded polyether-based urethane foams which are not only self-extinguishing (by ASTM D-1692-68) but are also of low burning extent.

The organosilicone polymers of this invention are prepared by any one of a number of reactions, the particular method employed depending primarily on whether the polysiloxane and polyoxyalkylene blocks are linked through an Si—C or Si—O—C linkage (Formulas I-A and I-B above, respectively) and whether the cyano-substituted groups are bonded to the polysiloxane backbone directly by an Si—C or through an Si—O—C bond (Formulas I-C and I-D above, respectively). One method by which the compositions encompassed by Formula I-A are provided comprises the platinum-catalyzed addition of monoolefinic polyoxyalkylene ethers to the cyano-substituted polyhydrocarbylpolysiloxane hydride fluids having Formula II hereinabove. This hydrosilation reaction is referred to herein as Method A and is illustrated by the following Equation 1:

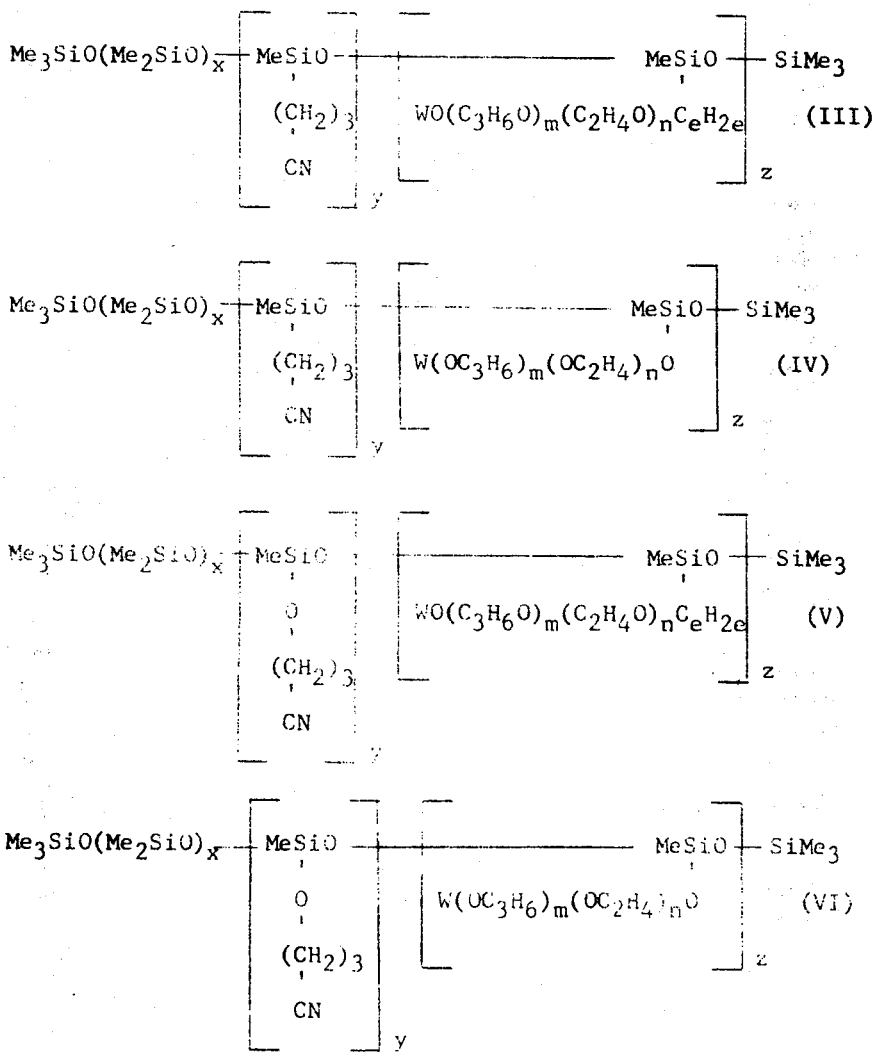

wherein:
  Me represents a methyl group (CH$_3$);
  $x$ has an average value of from about 20 to about 100;
  $y$ has an average value of from about 4 to about 30;
  $z$ has an average value from about 2 to about 10;
  $e$ has a value of from 2 to 4;
  W represents an R$^\infty$—, R$^\infty$C(O)— or R$^\infty$NHC(O)— group, where R$^\infty$— is a lower alkyl, phenyl or ar(lower)alkyl group; and
  $m$ and $n$ are positive numbers such that the average oxyethylene content of the oxyalkylene chain ranges from about 20 to about 65 weight per cent Equation 1:

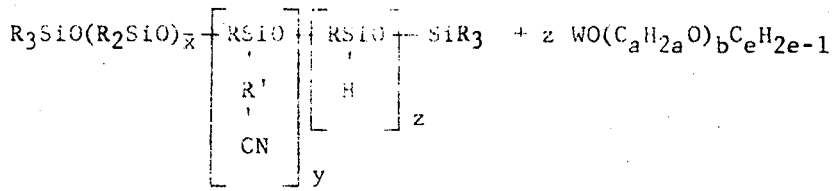

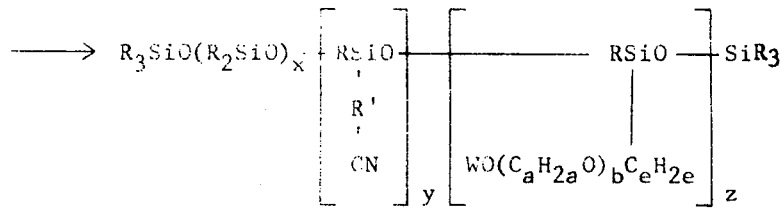

wherein

R, R', W, x, y, z, a, b and e have the aforesaid significance.

Preferably, the monoolefinic group, $-C_eH_{2e-1}$, of the polyether reactant employed in Method A is vinyl, allyl or methallyl, the allyl end-blocked reactants being especially suitable. One method for preparing such polyether reactants comprises starting alkylene oxide polymerization with an alkenol having at least three carbon atoms such as allyl alcohol to provide $HO(C_aH_{2a}O)_b$-$C_eH_{2e-1}$ (wherein e has a value of at least 3), followed by capping of the terminal hydroxyl group with the aforesaid organic radical W—, such as methyl, phenyl, benzyl, acetyl, methylcarbamyl and like capping groups. Further details concerning the method of preparation of such polyether reactants are as described in British Patent Specifications Nos. 1,220,471 and 1,220,472. Alternatively, the polyether reactants can be prepared by starting the alkylene oxide polymerization with an alkanol such as methanol, an aralkyl alcohol such as benzyl alcohol, phenol and the like, followed by capping of the terminal hydroxyl group of the reaction product with the monoolefinic group such as vinyl, allyl, methallyl and the like. Of these various monoolefinically unsaturated polyether reactants, allyl alcohol-started polyoxyalkylene ethers are especially suitable. It is to be understood that the polyoxyalkylene chain, $-(C_aH_{2a}O)_b-$, of the polyether reactants is composed of from about 20 to about 65 weight per cent of oxyethylene units, $-(C_2H_4O)_n-$, the remaining oxyalkylene units being oxypropylene and/or oxybutylene. The different types of oxyalkylene units can be randomly distributed throughout the chain such as when a mixture of alkylene oxides is polymerized, or they can be arranged as sub-blocks such as when the respective alkylene oxides are polymerized sequentially.

The organosilicone polymers of this invention wherein the polysiloxane and polyoxyalkylene blocks are joined through an Si—O—C bond (that is, the compositions encompassed by Formula I-B above) are provided by the catalyzed condensation of silicon-bonded hydrogen of the Si—H fluids having Formula II above with hydrogen of the —OH group of hydroxyl-terminated polyether reactants. This method is referred to herein as Method B and is illustrated by the following reaction of Equation 2:

Equation 2:

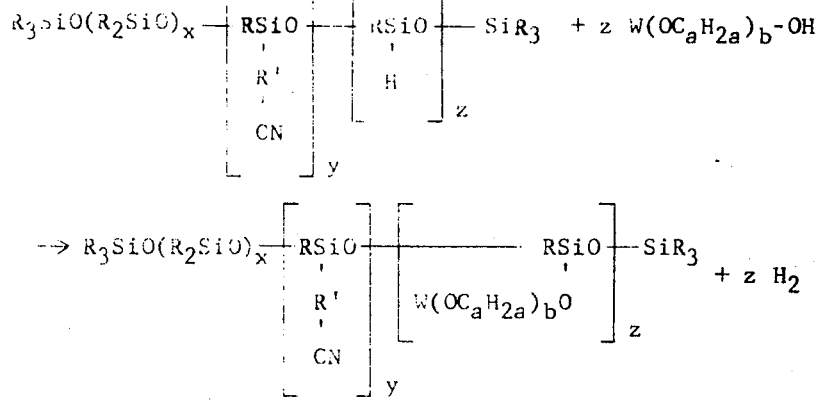

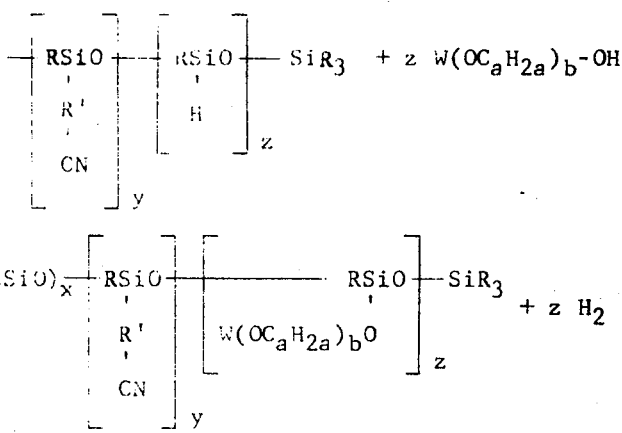

wherein R, R', W, x, y, z, a and b have the significance defined with specific reference to Formula I.

When the cyano-substituted group (—R'CN) of the organosilicone block copolymers of this invention is bonded to silicon by an Si—C bond, that is, when —R'— is the bivalent alkylene group, —R'—, also expressed hereinabove as $-C_cH_{2c}-$ wherein c has a value from 2 to 12, the polymers may also be prepared by a third method, referred to herein as Method C. The latter method comprises the platinum-catalyzed hydrosilation of cyanosubstituted alkenes having the formula, $C_cH_{2c-1}CN$, where c is as aforesaid, employing polyalkylsiloxane hydride fluids. In accordance with one embodiment of Method C, the hydrosilation of the cyano-substituted alkene is carried out concurrently with hydrosilation of the monoolefinically endblocked polyether reactant as illustrated by the following Equation 3:

Equation 3:

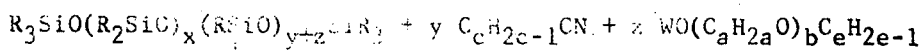

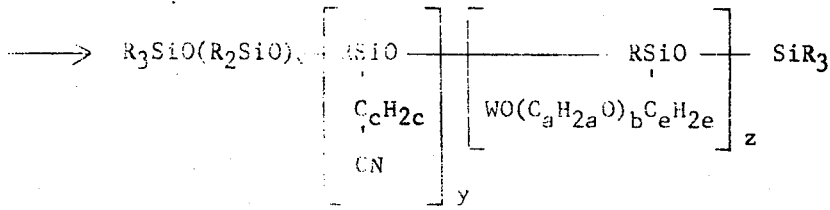

It is to be understood that the reaction of Equation 3 may also be carried out by first hydrosilating $z$ mols of the polyether reactant to provide an intermediate having the average composition,

which is then reacted with $y$ mols of the cyano-alkene to provide the product shown in Equation 3.

In accordance with still another embodiment of Method C, the polyalkylsiloxane hydride fluid shown in Equation 3 is reacted initially with $y$ mols of cyanoalkene followed by reaction of the intermediate cyanoalkylmodified polyalkylsiloxane hydride with $z$ mols of either the monoolefinically unsaturated polyether reactant shown in Equation 1 or the hydroxyl-terminated polyether reactant shown in Equation 2. This sequence of reactions is illustrated by Equations 4a–4c:

Equation 4a:

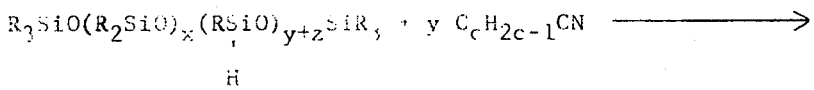

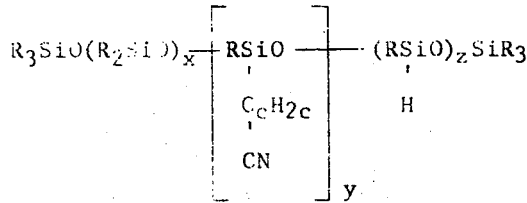

Equation 4b:

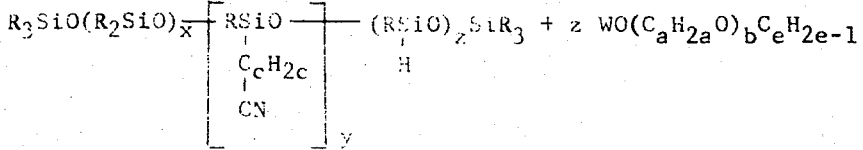

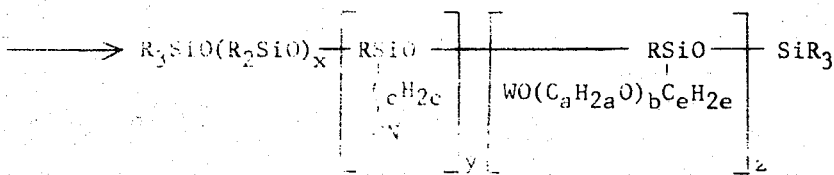

Equation 4c:

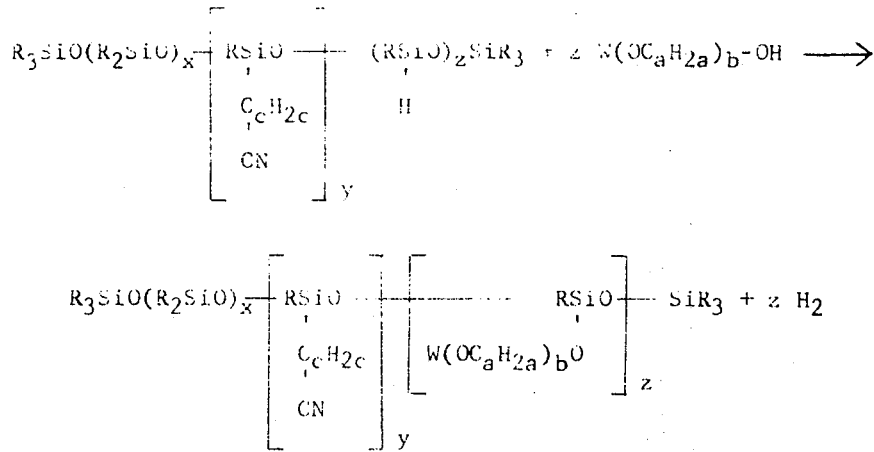

wherein
R, W, $a$, $b$, $c$, $e$, $x$, $y$ and $z$ are as previously defined.
When R is methyl and $c$ is three, and the polyether reactants are $WO(C_3H_6O)_m(C_2H_4O)_nCH_2CH=CH_2$ and $WO(C_3H_6O)_m(C_2H_4O)_nH$, the polymer products of Equations 4b and 4c have the average compositions shown hereinabove by Formula III (that is, when $e$ therein is three) and Formula IV, respectively.

When the cyano-substituted groups (—R'CN) of the organosilicone block copolymers of this invention are bonded to silicon by Si—O—C linkages, that is, when —R'— is the oxyalkylene group, —OR°—, wherein —R°— is more specifically defined as —$C_cH_{2c}$—, $c$ having a value from 2 to 12, the polymers are prepared by a fourth method, referred to herein as Method D. The latter method comprises hydrogen condensation of Si—H and HO—C groups derived respectively from polyalkylsiloxane hydrides and cyano-substituted alkanols having the formula, HO—$C_cH_{2c}$—CN, wherein $c$ is as aforesaid. In accordance with one embodiment of Method D, the condensation reaction is carried out simultaneously with hydrogen condensation of Si—H of the polyalkylsiloxane hydride and HO—C of hydroxyl-terminated polyether reactants, as shown by the following Equation 5:

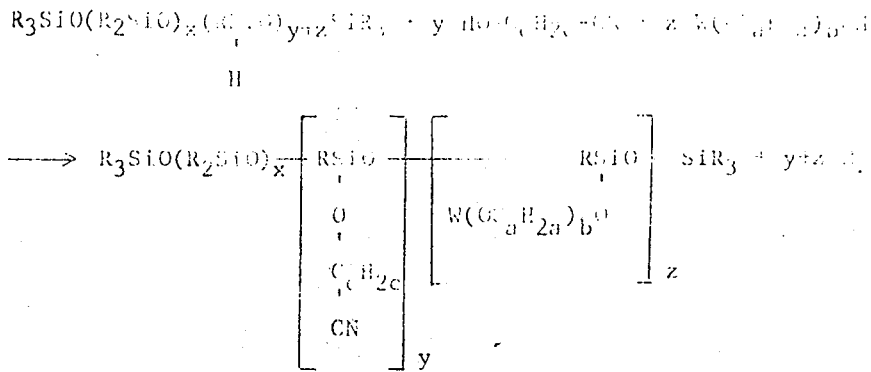

wherein
R, W, $a$, $b$, $c$, $x$, $y$ and $z$ have the abovedefined significance.

It is to be understood that the reaction of Equation 5 may also be carried out by first reacting $z$ mols of the polyether reactant with the polyalkylsiloxane hydride to provide an intermediate having the average structure:

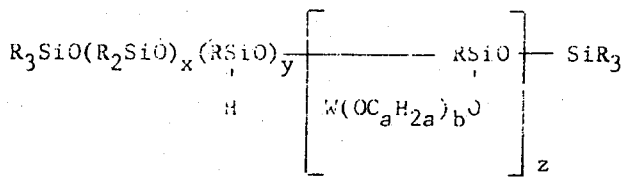

which is then reacted with the cyano-alkanol to provide the polymer product shown in Equation 5. In accordance with another embodiment of Method D, the polyalkylsiloxane hydride fluid is partially reacted initially with $y$ mols of the cyano-alkanol followed by reaction of the intermediate cyanoalkoxy-modified Si—H fluid with $z$ mols of either the monoolefinically unsaturated polyether reactant shown in Equation 1 or the hydroxyl-terminated polyether reactant shown in Equation 2. This sequence of reactions is illustrated by Equations 6a –6c:

Equation 6a:

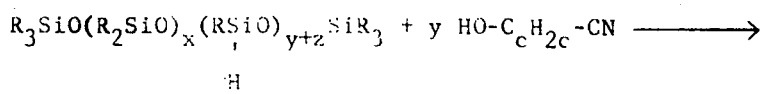

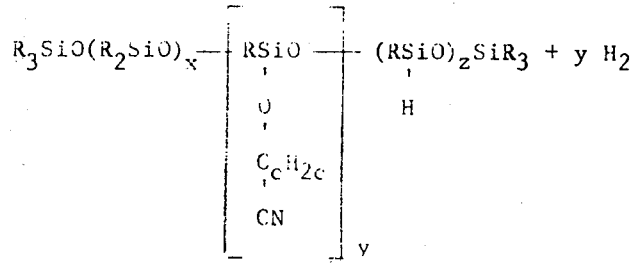

Equation 6b

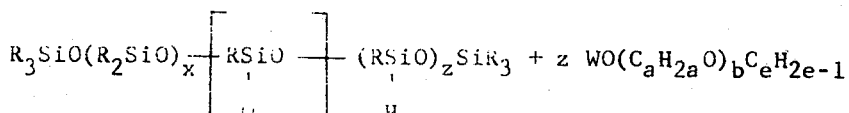

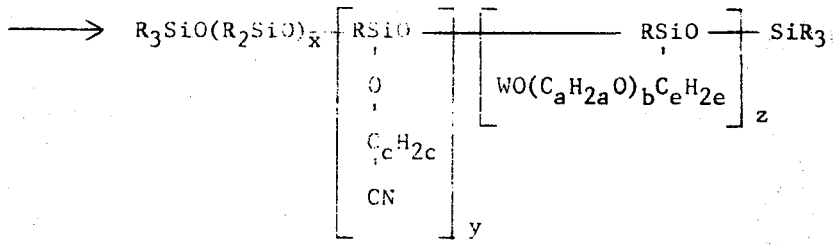

Equation 6c:

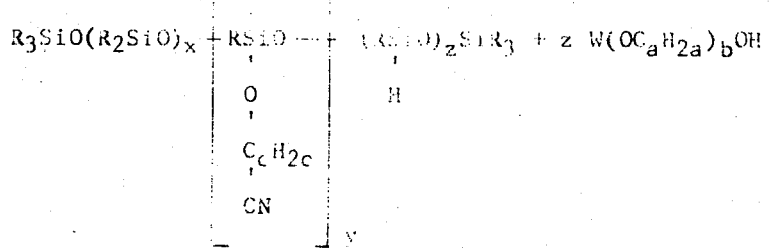

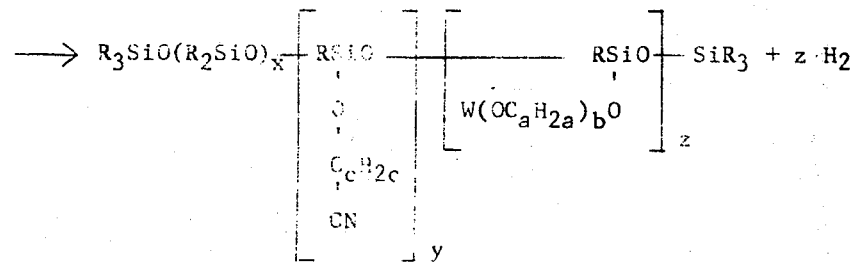

wherein

R, W, $a$, $b$, $c$, $e$, $x$, $y$ and $z$ are as previously defined. When R is methyl and $c$ is three, and the polyether reactants are $WO(C_3H_6O)_m(C_2H_4O)_nCH_2CH=CH_2$ and $WO(C_3H_6O)_m(C_2H_4O)_n-H$, the polymer products of Equations 6b and 6c have the compositions shown hereinabove by Formula V (that is, when $e$ therein is three) and Formula VI, respectively.

The hydrosilation reactions illustrated by Equations 1, 3, 4a, 4b and 6b, which overall comprise the addition of Si—H to the respective monoolefinic groups of the polyether and cyano-alkene reactants, are effected in the presence of a platinum catalyst. Particularly effective is platinum in the form of chloroplatinic acid dissolved, if desired, in a solvent such as tetrahydrofuran, ethanol, butanol or mixed solvents such as ethanol-ethylene glycol dimethyl ether. It is to be understood, however, that other platinum derivatives known to the art as hydrosilation catalysts may also be used. The platinum is present in a catalytic amount such as from about 5 to about 300 parts per million (p.p.m.) parts by weight of the combined weight of the silicon-containing and organic reactants. The more usual platinum concentration is from about 5 to about 150 p.p.m. Suitable reaction temperatures range from about room temperature (25°C.) to about 200°C., and are more usually from about 60°C. to about 150°C.

The condensation reactions illustrated by Equations 2, 4c, 5, 6a and 6c, which comprise the reaction of silanic hydrogen (Si—H) and hydrogen of the —OH groups of the hydroxyl-terminated polyether reactant and the cyano-alkanol reactant, are promoted by a variety of catalysts such as organic derivatives of tin, platinum and other transition metals. Especially suitable are organic derivatives of tin such as tin carboxylates which are typically illustrated by stannous octoate, stannous oleate, stannous laurate and dibutyl tin dilaurate. These catalysts are employed in amounts from about 0.1 to about 5, and usually no more than about 2, weight per cent, based on the total weight of the reactants. The Si—H/HO—C condensation reactions are effected at temperatures from about 60°C. to about 150°C., more usually from about 80°C. to about 120°C.

The various reactions of Equations 1 through 6c are usually carried out employing the organic reactants (that is, the polyether, cyano-alkene and cyano-alkanol) in amounts at least sufficient to react with a predetermined proportion of the silicon-bonded hydrogen of the Si-H reactant. From the standpoint of more effective and more complete reaction of silanic hydrogen, the organic reactants are usually employed in excess of stoichiometric requirements. In those reactions (Equations 1, 2, 4b, 4c, 6b and 6c) wherein the Si—H groups are to be completely reacted with only one of the organic reactants to form the desired final polymer, the organic reactant may be employed in amounts corresponding to a 100 or more weight per cent excess. In the case of the polyether reactant, however, usually no more than about a 50 weight per cent excess is used. On the other hand, when the Si—H reactant is either partially reacted initially with one of the organic reactants as shown, for example, by Equations 4a and 6a, or is reacted with the polyether and cyano-substituted reactants concurrently as shown by Equations 3 and 5, the organic reactants are employed in an amount just sufficient to satisfy the predetermined stoichiometric requirements of the desired reaction or only a small excess such as up to about 50 weight per cent is used.

If desired, the hydrosilation and condensation reactions may be conducted in a solvent medium which is substantially non reactive with Si—H under the reaction conditions. Therefore, the use of hydroxyl-containing solvents including alcohols such as methanol, ethanol, propanol and ether alcohols, as the medium in which the reaction is carried out should be avoided. Suitable non reactive solvents are the normally liquid aromatic hydrocarbons such as benzene, toluene and xylene, although other non reactive solvents such as ethers can also be used. Upon completion of the respective hydrosilation and condensation reactions, any unreacted cyano-alkene or cyano-alkanol, or any organic solvent employed in the polymer preparation, may be removed by conventional separation techniques to obtain the final product comprising the polymer compositions of the invention. It is to be understood that some portion of the solvent and excess reactants may remain in the product and that such diluted polyer compositions are within the scope, and may be used in accordance with the teachings, of this invention. In the hydrosilation reactions, the removal or neutralization of the chloroplatinic acid catalyst is usually desirable for longrange product stability. Neutralization is readily effected by adding sodium bicarbonate to the reaction mixture followed by filtration of the resultant slurry to remove the neutralizing agent and platinum residues.

The cyano-substituted polyhydrocarbylsiloxane hydride fluids encompassed by Formula II and employed in the reaction of Equations 1, 2, 4b, 4c, 6b and 6c, are in turn provided by any one of a number of methods. The particular method employed depends upon whether the cyano-bearing siloxy unit,

has the more specific unit formula,

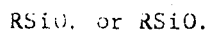

Overall, the methods employed in providing the cyano-substituted Si-H fluids encompassed by Formula II comprise the use of various combinations of the following precursor reactants as the source of the indicated units or groups:

a. Hexaalkyldisiloxanes, $R_3SiOSiR_3$, as the source of the endblocking units, $R_3SiO_{1/2}$;
b. Cyclic dialkylsiloxane polymers $[R_2SiO]_q$, where $q$ usually has an average value of from about 3 to about 6, as the source of the difunctional dialkylsiloxy units, $R_2SiO$;
c. Trialkyl-endblocked dialkylsiloxane polymers, $R_3SiO(R_2SiO)_rSiR_3$, where $r$ has an average value of at least two and is usually no more than about 10, as the source of the endblocking units, $R_3SiO_{1/2}$, and as a source of the dialkylsiloxy units, $R_2SiO$;
d. Cyanoalkyl-alkylsiloxane polymers as the source of the NC—R°(R)SiO units, where R°, as previously defined, is the bivalent alkylene radical, —$C_cH_{2c}$—, $c$ having a value from 2 to 12, the said polymers being formed by the hydrolysis of cyanoalkylalkyldichlorosilanes, NC—R°(R)SiCl$_2$, followed by the base-catalyzed dehydration-cyclization of the hydrolyzate to form cyclics having the formula, $[NC—R°(R)SiO]_w$, the average value of $w$ being from about 3 to about 12 or more and is preferably from about 4 to about 8;
e. Polymeric alkylsiloxane hydride fluids having an Si—H content sufficient to provide from about 200 to about 372 cubic centimeters of hydrogen per gram, as the source of the

units;

f. Cyano-substituted alkenes, $C_cH_{2c-1}CN$, where $c$ as previously defined is from 2 to 12, as the source of the $NC-R°-$ groups of the $NC-R°-(R)SiO$ units, where $R°$ is more particularly shown as the bivalent alkylene radical, $-C_cH_{2c}-$; and g. Cyano-substituted alkanols, $HO-R°-CN$, as the source of the $NC-R°O-$ groups of the $NC-R°O(R)SiO$ units, where $R°$ is also more particularly shown as the bivalent alkylene radical, $-C_cH_{2c}-$.

One method for providing the cyanoalkyl-substituted polyalkylsiloxane hydrides encompassed by Formula II wherein $R'$ is the bivalent alkylene radical, $-R°-$, that is, compositions having the following Formula II-A wherein $-R°-$ is more particularly shown as $-C_cH_{2c}-$,

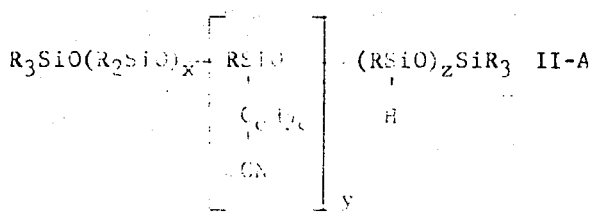

comprises equilibration of either one of the above reactants (a) and (c) with reactants (b), (d) and (e). These reactants are illustrated by the following Equations 7 and 8 in which polymeric reactants (b), (d) and (e) are shown, for convenience, simply as the monomeric units which they provide:

Equation 7:

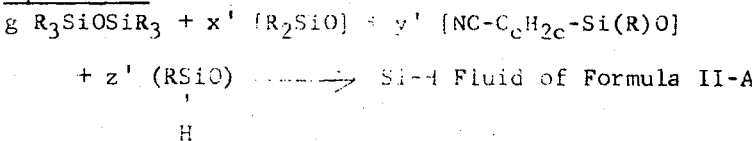

Equation 8:

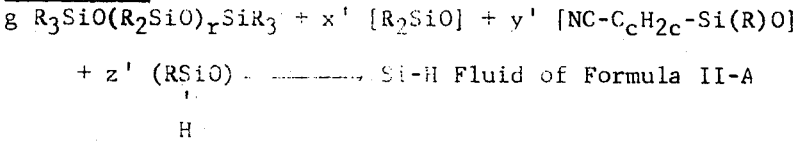

wherein:
R, as previously defined, is an alkyl group having from 1 to 10 carbon atoms;
$c$ has a value from 2 to 12; and
$x$, $y$ and $z$ of the Si—H Fluid of Formula II-A have respective average values from about 10 to about 200, about 3 to about 100, and about 2 to about 30.

In the above Equations 7 and 8 and other equations hereinbelow, $g$ represents the actual number of mols of the indicated reactant, and $x'$, $y'$ and $z'$ represent the actual number of mol-equivalents of the indicated monomeric units provided by the polymeric source of such units, that is, reactants (b), (d) and (e), respectively. It is to be understood, therefore, that $g$, $x'$, $y'$ and $z'$ can be any positive number depending upon the scale on which the reactions are run, provided that when normalized on the basis of $g=1$, the mol ratios of $x':y':z'$ (Equation 7) and $[x' + (g \times r)]:y': :Z'$ (Equation 8) are about 10–200:3–100:2–30, respectively, thereby providing polymer products wherein the ration of $x:y:z$ is 10–200:3–100:2–30, as previously defined.

In providing the Si—H fluids by the one-step reactions of Equations 7 and 8, standard base-catalyzed equilibration reaction conditions are not suitable in view of the base-sensitivity of the Si—H groups. Further, in view of the susceptibility of cyano groups to hydrolysis in aqueous acidic media, the equilibration reaction is effected under substantially anhydrous conditions. It has been found that a particularly effective catalyst for promoting the reactions of Equations 7 and 8, is trifluoromethylsulfonic acid ($CF_3SO_3H$) employed in substantially anhydrous form (that is, containing less than about 1.0 weight per cent water). This catalyst provides a proper balance of acidity to promote the equilibration reaction without causing substantial cleavage of the —Si—O—Si— siloxane linkages. The catalyst is usually employed in a concentration of from about 0.1 to about one weight per cent, based on the total weight of reactants. The acid-catalyzed equilibration reactions of Equations 7 and 8 are carried out with vigorous mechanical stirring at temperatures within the range from about 20°C. to about 120°C. at least until the reaction mixture becomes homogeneous. Effecting the reaction at ordinary ambient temperatures (20°–25°C.) usually provides a satisfactory rate of reaction. After completion of the reaction, the reaction product is neutralized with base such as sodium bicarbonate and filtered, sometimes adding a liquid hydrocarbon such as xylene or toluene to facilitate the filtration. When a diluent is used, it is conveniently separated from the reaction product by rotary vacuum evaporation.

In addition to the one-step reactions of Equations 7 and 8, the cyano-substituted polyalkylsiloxane hydrides having Formula II-A may also be prepared in step-wise manner as shown by the sequence of reactions of Equations 9a and 9b:

Equation 9a:

$g\ R_3SiOSiR_3 + x'\ (R_2SiO) + y'\ [NC-C_cH_{2c}-Si(R)O] \longrightarrow$

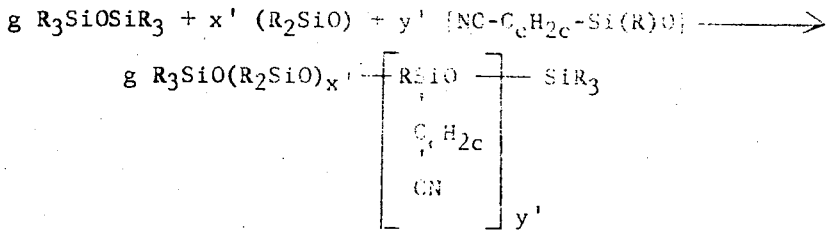

Equation 9b:

Product of Equation 9a + $(RSiO)$ ⟶
                         |
                         H Si-H Fluid of Formula II-A In view of the fact that the Si—H reactant is not used in the reaction of Equation 9a, it may be effected in the presence of conventional alkaline equilibration catalysts useful in the preparation of unmodified polyalkylsiloxanes. Illustrative of such alkaline catalysts are potassium silanolate, cesium hydroxide and tetramethyl ammonium silanolate. such promoters are usually employed in concentrations of from about 30 to 50 p.p.m., based on the total weight of reactants. The temperature at which the base-catalyzed equilibration reaction of Equation 9a is carried out depends largely on the catalyst employed. Thus, when tetramethyl ammonium silanolate is used, suitable reaction temperatures are from about 75°C. to about 100°C., preferably from about 80°–90°C. The other alkaline catalysts usually require higher temperatures such as at least about 150°C. to about 200°C. The further reaction of the product of Equation 9a to introduce the $$\begin{array}{c} RSiO \\ | \\ H \end{array}$$

units, as shown by Equation 9b, is carried out in the presence of trifluoromethylsulfonic acid as described with specific reference to the reactions of Equations 7 and 8.

A third route to the cyanoalkyl-substituted polyalkylsiloxane hydrides encompassed by Formula II-A comprises the use of cyano-alkenes, described above as reactant (f), as the source of the cyanoalkyl groups, as illustrated by the following sequence of reactions:

The reaction of Equation 10a is effected in the presence of trifluoromethylsulfonic acid or known acid equilibration catalysts such as sulfuric acid, at temperatures usually from 20°C. to about 50°C. The reaction of Equation 10b is platinum-catalyzed and is effected under the conditions described with specific reference to the hydrosilation reactions shown, for example, by Equation 1. The reaction of Equation 10c is acid-catalyzed and is carried out under the conditions described with reference to Equations 7 and 8, employing trifluoromethylsulfonic acid as the catalyst. Prior to the further reaction of the intermediate cyanoalkyl-substituted fluid provided by Equation 10b, however, it is desirable to separate any unreacted cyano-alkene or isomerized derivatives thereof, in order to minimize any tendency of such compounds to react with the acid catalyst (e.g., trifluoromethylsulfonic acid) employed in the reaction of Equation 10c.

In providing the cyanoalkyl-substituted polyalkylsiloxane hydrides encompassed by Formula II-A, various modifications of the reactions of Equations 7–10c may be had without departing from the scope of the invention. For example, instead of introducing the $$\begin{array}{c} RSiO \\ | \\ H \end{array}$$

units in two stages (Equations 10a and 10c), the $$\begin{array}{c} RSiO \\ | \\ H \end{array}$$

Equation 10a:

$$g\ R_3SiOSiR_3 + x'\ (R_2SiO) + y'\ (RSiO) \atop | \atop H \longrightarrow$$

$$g\ R_3SiO(R_2SiO)_x{'}(RSiO)_y{'}SiR_3 \atop | \atop H$$

Equation 10b:

$$g\ R_3SiO(R_2SiO)_x{'}(RSiO)_y{'}SiR_3 + y'\ NC\text{-}C_cH_{2c-1} \longrightarrow \atop | \atop H$$

$$g\ R_3SiO(R_2SiO)_x{'}(RSiO)_y{'}SiR_3 \atop | \atop \begin{array}{c}C_cH_{2c}\\|\\CN\end{array}$$

Equation 10c:

$$g\ R_3SiO(R_2SiO)_x{'}(RSiO)_y{'}SiR_3 + z'\ (RSiO) \longrightarrow \atop | \atop \begin{array}{c}C_cH_{2c}\\|\\CN\end{array} \qquad\qquad |\atop H$$

Si-H Fluid of Formula II-A units may be introduced during the reaction of Equation 10a in a predetermined amount sufficient to provide the total desired amount ($y' + z'$) followed by partial reaction of the Si—H groups with $y'$ mols of cyanoalkene reactant. This latter embodiment is illustrated by the hydrosilation reaction of Equation 4a above.

It is also evident that when the R group of each of the reactants shown in Equations 7–10c is methyl (Me) and c in each instance has a value of three, the resulting cyanopropyl-modified polymethylsiloxane hydride products have the following average composition:

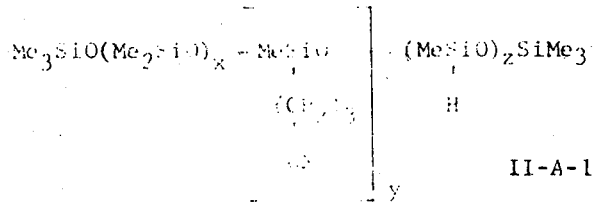

II-A-1

These Si—H fluids are useful in providing polysiloxanepolyoxyalkylene block copolymers encompassed by Formulas III and IV, by the hydrosilation or hydrogen condensation reactions of Equations 1 and 2, employing as the polyether reactants, the above-described monoolefinically endblocked or hydroxyl-terminated poly(oxyethylene-oxypropylene) ether reactants having the formulas, $C_eH_{2e-1}(OC_2H_4)_n(OC_3H_6)_mOW$ and $HO—(C_2H_4O)_n(C_3H_6O)_mW$, respectively.

In providing the cyanoalkoxy-substituted polyalkylsiloxane hydrides encompassed by Formula II wherein R' is the bivalent oxyalkylene radical, $—OR°—$, that is, compositions having the following Formula II-B

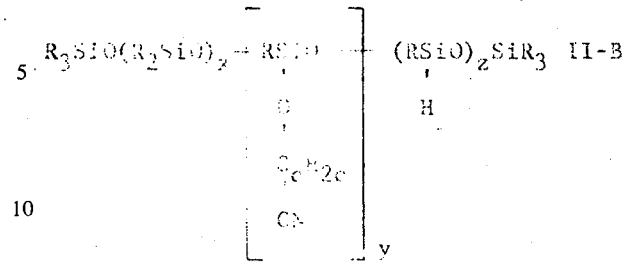

II-B wherein $—R°—$ is more particularly shown as $—C_cH_{2c}—$, a cyano-substituted alkanol, $HO—C_cH_{2c}—CN$, described above as reactant (g), is suitably employed as the source of the cyanoalkoxy group. Such Si—H fluids are prepared by methods which comprise the condensation of silanic hydrogen of polyalkylsiloxane hydrides with hydrogen of the HO—C groups of the cyanoalkanols. One such method is as illustrated by the reaction of Equation 6a, which as previously described herein, is usually promoted by catalysts comprising tin such as stannous octoate. A further method comprises the sequence of reactions shown by Equations 10a–10c employing a cyano-alkanol in place of the cyanoalkene reactant and preferably promoting the reaction of Equation 10b with one of the aforesaid catalysts comprising an organic derivative of tin such as stannous octoate. By way of specific illustration, cyanopropoxysubstituted polymethylsiloxane hydrides having the average composition:

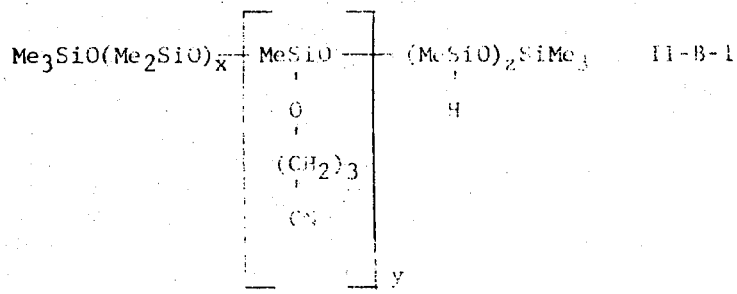

II-B-1 are provided by reactions of the following Equations 11a–11c and 12, employing 3-cyanopropanol as the source of the 3-cyanopropoxy groups:

Equation 11a:

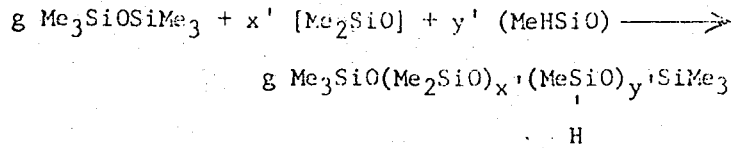

Equation 11b:

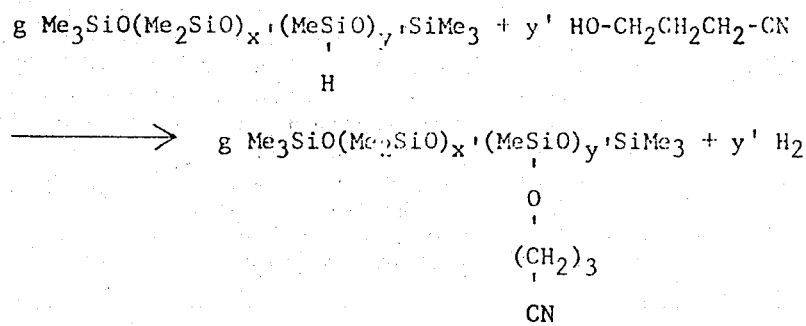

Equation 11c:

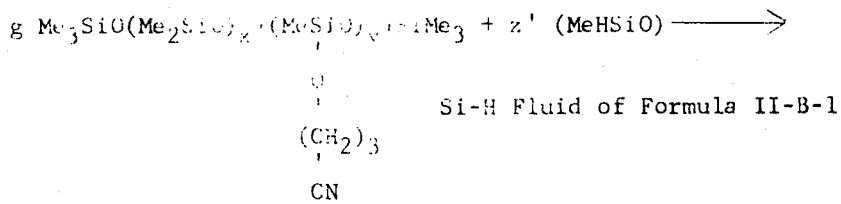

Si—H Fluid of Formula II-B-1

Equation 12:

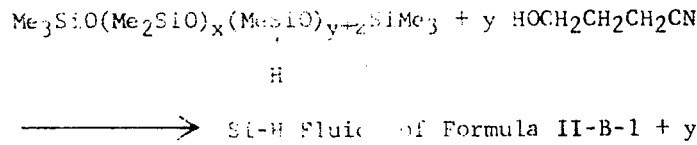

⟶ Si—H Fluid of Formula II-B-1 + y H$_2$

The reactions of Equations 11b and 12 are carried out in the presence of the metal catalysts, preferably tin carboxylates such as stannous octoate, as described, for example, with specific reference to the reaction of Equation 2.

The Si—H fluids having Formula II-B-1 are useful in providing the polysiloxane-polyoxyalkylene block copolymers encompassed by Formulas V and VI by the hydrosilation or hydrogen condensation reactions of Equations 1 and 2, employing as the polyether reactants the above-described monoolefinically endblocked or hydroxyl-terminated poly(oxyethyleneoxypropylene) ethers, $C_eH_{2e-1}(OC_2H_4)_n(OC_3H_6)_mOW$ and $HO—(C_2H_4O)_n(C_3H_6O)_mW$, respectively.

The organosilicone polymers of the invention including the block copolymer surfactants encompassed by Formula I and the cyano-substituted Si—H fluids encompassed by Formula II, are normally liquid compositions and comprise mixtures of polymer species which differ in molecular weight, polyether and siloxane contents and relative number of monomeric units. It is to be understood, therefore, that as expressed herein, the values of these parameters are average values. Further, two or more block copolymers having a particular average composition encompassed by Formula I may be admixed to adjust the average values of x, y and z, as desired. For example, a block copolymer wherein y has an average value of about 45 may be admixed with another composition wherein y has an average value of about 15 to provide a polysiloxane-polyoxyalkylene block copolymer wherein y has an average value of about 30. It also is to be understood that a small percentage (on the average, usually about 10 mol per cent or less) of the polyoxyalkylene blocks may comprise residual, uncapped hydroxyl-terminated groups introduced with the polyoxyalkylene ether reactants.

The above-described polyoxyalkylene-polysiloxane block copolymers of the invention can be employed as a 100 percent active stream or in dilute form as a solution in various types of organic liquids including polar and non polar solvents. For example, the polymers may be diluted with non polar solvents such as the normally liquid aliphatic and aromatic unsubstituted and halogen-substituted hydrocarbons such as heptane, xylene, toluene, chlorobenzene and the like. When used, the preferred diluents are compounds encompassed by the formula:

wherein:
Z is hydrogen or a monovalent hydrocarbon group including alkyl (e.g., methyl, ethyl, propyl and butyl), aryl (e.g., phenyl and tolyl) and aralkyl (e.g., benzyl) groups;
Z' is a bivalent alkylene group (e.g., ethylene, propylene, trimethylene and butylene);
Z'' is a monovalent hydrocarbon group such as defined for Z; and
t has an average value of at least two.

When Z is hydrogen, it is preferred that such ZO groups (that is, —OH) represent no more than about 5 weight per cent of the solvent. Suitable solvents are alkylene oxide adducts of starters such as water, monools, diols and other polyols. Such organic starters are typically illustrated by butanol, propylene glycol, glycerol and 1,2,6-hexantriol. Preferred adducts of the organic starters are the mixed alkylene oxide adducts, particularly those containing a combination of oxyethylene and oxypropylene units. For example, one class of such organic solvents which may be present in the solution compositions of this invention, are mixed ethylene oxide-propylene oxide adducts of butanol which are represented by the general formula, $HO(C_2H_4O)_s(C_3H_6O)_uC_4H_9$, wherein s has an average value from about 8 to about 50, and u has an average value from about 6 to about 40. Preferably, the values of s and u are such that the weight per cent of oxyethylene units is about equal to the weight per cent of the oxypropylene units. The solution compositions of this invention preferably contain from about 25 to about 80 parts by weight of the polysiloxane-polyoxyalkylene block copolymers per 100 parts by weight of the total weight of copolymer and solvent, but can contain from 1 to 99 parts by weight of the copolymer.

The organosilicone polymer surfactants of this invention may also be used in combination with non ionic organic surfactants such as adducts produced by reacting k mols of ethylene oxide (wherein k has an average value from about 4 to about 40, inclusive of whole and fractional numbers) per mol of any of the following hydrophobes: n-undecyl alcohol, myristyl alcohol, lauryl alcohol, trimethyl nonanol, tridecyl alcohol, pentadecyl alcohol, cetyl alcohol, nonylphenol, dodecylphenol, tetradecylphenol and the like. Especially useful are ethylene oxide adducts of nonylphenol having the average composition, $C_9H_{19}—C_6H_4—(OC_2H_4)_hOH$, wherein $h$ has an average value from about 9 up to about 20 or more, including whole and fractional numbers such as 9, 10.5, 13, 14.5 and 15. When used, such non ionic organic surfactants are used in amounts from about 2 to about 20 parts by weight per 100 parts by weight of the block copolymer. It is to be understood that such additives may also be present as a component of the aforementioned solutions of the block copolymers.

Also included within the scope of this invention is the use of the cyano-substituted polysiloxane-polyoxyalkylene block copolymers of this invention in combination with other types of siliconcontaining surfactants such as, for example, those in which the backbone of the siloxane blocks is substituted only with silicon-bonded methyl or other alkyl groups such as the block copolymers described in the aforementioned U.S. Pat. No. 3,505,377. Other organosilicones which can be used in combination with the surfactants of this invention are those wherein the siloxane backbone is substituted with a combination of alkyl (for example, methyl) and aralkyl groups (for example, phenylethyl) such as the block copolymers described in the aforementioned U.S. Pat. No. 3,657,305. Illustrative of further organosilicones with which the polymers of this invention may be used in combination are those wherein the polysiloxane block is substituted with methyl only and the polysiloxane and polyoxyalkylene blocks are linked by an Si—O—C linkage such as the compositions described in U.S. Pat. No. 2,834,748. When used, the additional organosilicone is used in a minor amount which is usually from about 1 to about 30 parts by weight per 100 parts by weight of the block copolymer of this invention.

In addition to the cyano-substituted polysiloxane-polyoxyalkylene copolymers of the present invention, the other essential types of components and reactants employed in providing flexible polyurethane foams as described herein are polyether polyols, organic polyisocyanates, the catalyst system and blowing agent, and, when producing flame-retarded foams, the foam-producing reaction mixture also contains a flame-retardant. The organosilicone polymer surfactants of this invention are usually present in the final foam-producing reaction mixtures in amounts of from about 0.1 to about 5 parts by weight per 100 parts by weight of the polyether polyol reactant.

In producing the flexible polyurethane polymers of the present invention, one or more polyether polyols is employed for reaction with the polyisocyanate reactant to provide the urethane linkage. Such polyols have an average of at least two, and usually not more than six, hydroxyl groups per molecule and include compounds which consist of carbon, hydrogen and oxygen and compounds which also contain phosphorus, halogen and/or nitrogen.

Among the suitable polyether polyols that can be employed are the poly(oxyalkylene) polyols, that is, alkylene oxide adducts of water or a polyhydric organic compound as the initiator or starter. For convenience, this class of polyether polyols is referred to herein as Polyol I. Illustrative of suitable polyhydric organic initiators are any one of the following which may be employed individually or in combination: ethylene glycol; diethylene glycol; propylene glycol; 1,5-pentanediol; hexylene glycol; dipropylene glycol; trimethylene glycol; 1,2-cyclohexanediol; 3-cyclohexane-1,1-dimethanol and dibromo-derivative thereof; glycerol; 1,2,6-hexanetriol; 1,1,1-trimethyolethane; 1,1,1-trimethyolpropane; 3-(2-hydroxyethoxy)- and 3-(2-hydroxypropoxy)-1,2-propanediols; 2,4-dimethyl-2-(2-hydroxyethoxy)methylpentanediol-1;5; 1,1,1-tris[(2-hydroxyethoxy)methyl]ethane; 1,1,1-tris[(2-hydroxypropoxy)methyl]propane; pentaerythritol; sorbitol; sucrose; alpha-methyl glucoside; other such polyhydric compounds consisting of carbon, hydrogen and oxygen and having usually not more than about 15 carbon atoms per molecule; and lower alkylene oxide adducts of any of the aforesaid initiators such as propylene oxide or ethylene oxide adducts having a relatively low average molecular weight up to about 800.

The above-described polyether polyols are normally liquid materials and, in general, are prepared in accordance with well known techniques comprising the reaction of the polyhydric starter and an alkylene oxide in the presence of an oxyalkylation catalyst which is usually an alkali metal hydroxide such as, in particular, potassium hydroxide. The oxyalkylation of the polyhydric initiator is carried out at temperatures ranging from about 90°C. to about 150°C. and usually at an elevated pressure up to about 200 p.s.i.g., employing a sufficient amount of alkylene oxide and adequate reaction time to obtain a polyol of desired molecular weight which is conveniently followed during the course of the reaction by standard hydroxyl number determinations. As is well known to this art, the hydroxyl numbers are determined by, and are defined as, the number of milligrams of potassium hydroxide required for the complete neutralization of the hydrolysis product of the fully acetylated derivative prepared from 1 gram of polyol or mixture of polyols. The hydroxyl number is also defined by the following equation which indicates its relationship with the molecular weight and functionality of the polyol:

$$OH = \frac{56.1 \times 1000 \times f}{M.W.}$$

wherein
OH = hydroxyl number of the polyol,
$f$ = average functionality, that is, the average number of hydroxyl groups per molecule of polyol, and
M.W. = average molecular weight of the polyol.

The alkylene oxides usually employed in providing the polyether polyol reactants are the lower alkylene oxides, that is, compounds having from 2 to 4 carbon atoms including ethylene oxide, propylene oxide, butylene oxides (1,2- or 2,3-) and combinations thereof. When more than one type of oxyalkylene unit is desired in the polyol product, the alkylene oxide reactants may be fed to the reaction system sequentially to provide polyoxyalkylene chains containing respective blocks of different oxyalkylene units or they may be fed simultaneously to provide substantially random distribution of units. Alternatively, the polyoxyalkylene chains may consist essentially of one type of oxyalkylene unit such as oxypropylene capped with oxyethylene units.

A second class of polyether polyols that are suitable for use in preparing the flexible polyurethane foams of the present invention are graft polymer/polyether polyols which, for convenience, are referred to herein as Polyol II. Such reactants are produced by polymerizing one or more ethylenically unsaturated monomers dissolved or dispersed in a polyether polyol in the presence of a free radical catalyst. Suitable polyether polyols for producing such compositions include, for example, any of the above described polyols encompassed by the definition of Polyol I. Illustrative of suitable ethylenically unsaturated monomers are those encompassed by the general formula,

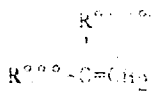

where:
$R^{\circ\circ\circ}$ is hydrogen, methyl or any of the halogens (i.e., fluorine, chlorine, bromine or iodine); and
$R^{\circ\circ\circ\circ}$ is $R^{\circ\circ\circ}$, cyano, phenyl, methyl-substituted phenyl, or alkenyl radicals having from 2 to 6 carbon atoms such as vinyl, allyl and isopropenyl groups.

Typical examples of such polymerizable monomers are the following which may be employed individually or in combination: ethylene, propylene, acrylonitrile, methacrylonitrile, vinyl chloride, vinylidene chloride, styrene, alpha-methylstyrene, and butadiene. These and other polymer/polyol compositions which are suitably employed either individually or in combination with Polyol I are those described in British Pat. No. 1,063,222 and U.S. Pat. No. 3,383,351, the disclosures of which are incorporated herein by reference. Such compositions are prepared by polymerizing the monomers in the polyol at a temperature between about 40°C. and about 150°C. employing any free radical-generating initiator including peroxides, persulfates, percarbonates, perborates, azo compounds such as, for example, hydrogen peroxide, dibenzoyl peroxide, benzoyl hydroperoxide, lauroyl peroxide, and azobis(isobutyronitrile). The graft polymer/polyether polyol product may also contain a small amount of unreacted polyether, monomer and free polymer.

When used in the practice of this invention, the polymer/polyol compositions usually contain from about 5 to about 50, and more usually from about 10 to about 40, weight per cent of the ethylenically unsaturated monomer polymerized in the polyether polyol. Especially suitable polymer/polyols are those containing:

A. from about 10 to about 30 weight per cent of a copolymer of (1) acrylonitrile or methacrylonitrile, and (2) styrene or alpha-methylstyrene, the said copolymer containing from about 50 to 75 and from about 50 to 25 weight per cent of (1) and (2), respectively; and B. from about 90 to about 70 weight per cent of the polyether polyol, and particularly trifunctional polyols such as alkylene oxide adducts of glycerol. These particular polymer/polyol compositions containing (A) and (B) are the subject of copending U.S. Pat. application Ser. No. 176,317, filed Aug. 30, 1971, in the name of David c. Priest.

In preparing polyurethane foams in accordance with the present invention, it is to be understood that mixtures of any of the aforesaid polyether polyols encompassed by Polyol I and Polyol II can be employed as reactants with the organic polyisocyanate. The particular polyether polyol or polyols employed depends upon the end-use of the polyurethane foam. Usually diols provide soft foams, firmer foams are obtained by the incorporation of polyether polyols having more than two hydroxyl groups, including triols, tetra-ols, pentols and hexols. When it is desired to produce polyurethanes having comparatively high loadbearing properties and/or diecutability, graft polymer/polyether polyols of the aforesaid type are used.

The hydroxyl number of the polyether polyol reactant including mixtures of polyols employed in the production of the flexible polyurethane foams of this invention may vary over a relatively wide range such as from about 28 to about 150, and is usually no higher than about 80.

The polyisocyanates used in the manufacture of polyurethanes are known to the art and any such reactants are suitably employed in producing the flexible polyether-based polyurethane foams of the present invention. Among such suitable polyisocyanates are those represented by the general formula:

$$Q'(NCO)_i$$

wherein:
$i$ has an average value of at least two and is usually no more than six, and
$Q'$ represents an aliphatic, cycloaliphatic or aromatic radical which can be an unsubstituted hydrocarbyl group or a hydrocarbyl group substituted, for example, with halogen or alkoxy.

For example, $Q'$ can be an alkylene, cycloalkylene, arylene, alkyl-substituted cycloalkylene, alkarylene or aralkylene radical including corresponding halogen- and alkoxy-substituted radicals. Typical examples of polyisocyanates for use in preparing the polyurethanes of this invention are any of the following including mixtures thereof: 1,6-hexamethylene diisocyanate, 1,4-tetramethylene diisocyanate, 1-methyl-2,4-diisocyanatocyclohexane, bis(4-isocyanatophenyl)methane, phenylene diisocyanates such as 4-methoxy-1,4-phenylenediisocyanate, 4-chloro-1,3-phenylenediisocyanate, 4-bromo-1,3-phenylenediisocyanate, 5,6-dimethyl-1,3-phenylenediisocyanate, 2,4-tolylene diisocyanate, 2,6-tolylene diisocyanate, crude tolylene diisocyanates, 6-isopropyl-1,3-phenylenediisocyanate, durylene diisocyanate, triphenylmethane-4,4',4''-triisocyanate, and other organic polyisocyanates known to the polyurethane art. Other suitable polyisocyanate reactants are ethylphosphonic diisocyanate and phenylphosphonic diisocyanate. Of the aforesaid types of polyisocyanates, those containing aromatic nuclei are generally preferred.

Also useful as the polyisocyanate reactant are polymeric isoycanates having units of the formula:

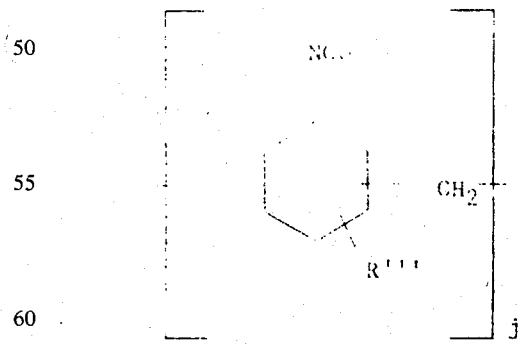

wherein
$R'''$ is hydrogen and/or lower alkyl and
$j$ has an average value of at least 2.1.

Preferably the lower alkyl radical is methyl and $j$ has an average value of from 2.1 to about 3.0 Particularly useful polyisocyanates of this type are the polyphenylmethylene polyisocyanates produced by phosgenation of the polyamine obtained by acid-catalyzed condensation of aniline with formaldehyde. Polyphenylmethylene polyisocyanates of this type are available commercially under such trade names as PAPI, NIAX Isocyanate AFPI, Mondur MR, Isonate 390P, NCO-120, Thanate P-220, NCO-10 and NCO-20. These products are low viscosity (50–500 centipoises at 25°C.) liquids having average isocyanato functionalities in the range of about 2.25 to about 3.2 or higher, depending upon the specific aniline-to-formaldehyde molar ratio used in the polyamine preparation.

Other useful polyisocyanates are combinations of diisocyanates with polymeric isocyanates containing more than two isocyanate groups per molecule. Illustrative of such combinations are: a mixture of 2,4-tolylene diisocyanate, 2,6-tolylene diisocyanate and the aforesaid polyphenylmethylene polyisocyanates and/or polymeric tolylene diisocyanates obtained as residues from the manufacture of the diisocyanates.

On a combined basis, the polyether polyol and organic polyisocyanate usually constitute the major proportion by weight of the polyurethane-forming reaction mixture. In general, the polyisocyanate and polyether polyol reactants are employed in relative amounts such that the ratio of total —NCO equivalents to total active hydrogen equivalent (of the polyether polyol and any water, when used) is from 0.8 to 1.5, preferably from 0.9 to 1.1, equivalents of —NCO per equivalent of active hydrogen. This ratio is known as the Isocyanate Index and is often also expressed as a per cent of the stoichiometric amount of polyisocyanate required to react with total active hydrogen. When expressed as a per cent, the Isocyanate Index may be from 80 to 150, and is preferably within the range from about 90 to about 110.

The urethane-forming reaction is effected in the presence of a minor amount of a catalyst comprising an amine. This component of the polyurethane-forming reaction mixture is usually a tertiary amine. Suitable amine catalysts include one or more of the following: N-methylmorpholine; N-ethylmorpholine; N-octadecylmorpholine; triethylamine; tributylamine, trioctylamine; N,N,N',N'-tetramethylethylenediamine; N,N,N',N'-tetramethyl-1,3-butanediamine; triethanolamine; N,N-dimethylethanolamine; triisopropanolamine; N-methyldiethanolamine; hexadecyldimethylamine; N,N-dimethylbenzylamine; trimethylamine; N,N-dimethyl-2-(2-dimethylaminoethoxy)ethylamine, also known as bis(2-dimethylaminoethyl)ether; triethylenedaimine (i.e., 1,4-diazabicyclo[2.2.2]octane); the formate and other salts of triethylenediamine, oxyalkylene adducts of the amino groups of primary and secondary amines and other such amine catalysts which are well known in the art of polyurethane manufacture. The amine catalyst may be introduced to the polyurethane-producing reaction mixture as such or as a solution in suitable carrier solvents such as diethylene glycol, dipropylene glycol, and 2-methyl-2,4-pentanediol ("hexylene glycol").

The amine catalyst is present in the final urethane-producing reaction mixture in an amount of from about 0.05 to about 3 parts by weight of active catalyst (that is, the amine exclusive of other components present in solutions thereof) per 100 parts by weight of the polyether polyol reactant.

In producting polyurethanes from polyether polyols usual practice is to include as a further component of the reaction mixture a minor amount of certain metal catalysts which are useful in promoting gellation of the foaming mixture. Such supplementary catalysts are well known to the art of flexible polyether-based polyurethane foam manufacture. For example, useful metal catalysts include organic derivatives of tin, particularly tin compounds of carboxylic acids such as stannous octoate, stannous oleate, stannous acetate, stannous laurate, dibutyl tin dilaurate, and other such tin salts. Additional metal catalysts are organic derivatives of other polyvalent metals such as zinc and nickel (e.g., nickel acetylacetonate). In general, the amount of such metal co-catalysts which can be present in the polyurethane-producing reaction mixture is within the range from about 0.05 to about 2 parts by weight per 100 parts by weight of the polyether polyol reactant.

Foaming is accomplished by the presence in the reaction mixture of varying amounts of a polyurethane blowing agent such as water which, upon reaction with isocyanate generates carbon dioxide in situ, or through the use of blowing agents which are vaporized by the exotherm of the reaction, or by a combination of the two methods. These various methods are known in the art. Thus, in addition to or in place of water, other blowing agents which can be employed in the process of this invention include methylene chloride, liquefied gases which have boiling points below 80°F. and above —60°F., or other inert gases such as nitrogen, carbon dioxide added as such, methane, helium and argon. Suitable liquefied gases include aliphatic and cycloaliphatic fluorocarbons which vaporize at or below the temperature of the foaming mass. Such gases are at least partially fluorinated and may also be otherwise halogenated. Fluorocarbon blowing agents suitable for use in foaming the formulations of this invention include trichloromonofluoromethane, dichlorodifluoromethane, 1,1-dichloro-1-fluoroethane, 1,1,1-trifluoro-2-fluoro-3,3-difluoro-4,4,4-trifluorobutane, hexafluorocyclobutene and octafluorocyclobutane. Another useful class of blowing agents include thermally-unstable compounds which liberate gases upon heating, such as N,N'-dimethyl-N,N'-dinitrosoterephthalamide, and the like. The generally preferred method of foaming for producing flexible foams is the use of water or a combination of water plus a fluorocarbon blowing agent such as trichloromonofluoromethane.

The amount of blowing agent employed in the foaming reaction will vary with factors such as the density that is desired in the foamed product. Usually, however, from about 1 to about 30 parts by weight of the blowing agent per 100 parts by weight of the polyether polyol reactant is preferred.

The organic flame-retardants that can be employed in producing flame-retarded flexible polyether foams in accordance with the teachings of this invention can be chemically combined in one or more of the other materials used (e.g., in the polyether polyol or polyisocyanate), or they can be used as discrete chemical compounds added as such to the foam formulation. The organic flame-retardants preferably contain phosphorus or halogen, or both phosphorus and halogen. Usually, the halogen, when present, is chlorine and/or bromine. Flame-retardants of the discrete chemical variety include: 2,2-bis(bromomethyl)-1,3-propanediol (also known as dibromoneopentyl glycol); 2,3-dibromopropanol, tetrabromophthalic anhydride; brominated phthalate ester diols such as those produced from tetrabromophthalic anhydride, propylene oxide and propylene glycol, tetrabromo-bisphenol-A; 2,4,6- tribromophenol; pentabromophenol; brominated anilines and dianilines; bis(2,3-dibromopropyl)ether of sorbitol; tetrachlorophthalic anhydride; chlorendic acid; chlorendic anhydride; diallyl chlorendate; chlorinated maleic anhydride; tris(2-chloroethyl)phosphate [(ClCH$_2$CH$_2$O)$_3$P(O)]; tris(2,3-dibromopropyl)phosphate; tris(1,3-dichloropropyl)phosphate; tris(1-bromo-3-chloroisopropyl)phosphate; bis(2,3-dibromopropyl) phosphoric acid or salts thereof; oxypropylated phosphoric and polyphosphoric acids; polyol phosphites such as tris(dipropylene glycol)phosphite; polyol phosphonates such as bis(dipropylene glycol)hydroxymethyl phosphonate; di-poly(oxyethylene)hydroxymethyl phosphonate; di-poly(oxypropylene)phenyl phosphonate; di-poly(oxypropylene)chloromethyl phosphonate; di-poly(oxypropylene)butyl phosphonate and 0,0-diethyl-N,N-bis(2-hydroxyethyl)aminomethyl phosphonate. Further flame-retardants suitable for use in providing the polyurethanes of the present invention are compounds having the formulas:

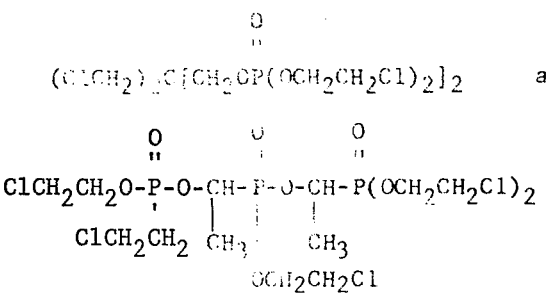

which are available from Monsanto Chemical Company under the names Phosgard 2XC-20 and Phosgard C-22-R, respectively. Other suitable flame-retardants comprise halogen-containing polymeric resins such as polyvinylchloride resins in combination with antimony trioxide and/or other inorganic metal oxides such as zinc oxide, as described in U.S. Pat. Nos. 3,075,927; 3,075,928; 3,222,305; and 3,574,149. It is to be understood that other flame-retardants known to the art may be used and that the aforesaid compounds may be employed individually or in combination with one another.

Those of the above flame-retardants of the discrete chemical compound variety which contain groups reactive with hydroxyl or isocyanato groups can be used as reactants in producing the polyether polyol reactant or they can be reacted with organic polyisocyanates, to produce modified polyols or polyisocyanates having chemically combined flame-retarding groups. Such modified polyether polyols and polyisocyanates are also useful as reactants in the process of this invention. In such cases, due regard must be given to the possible effect of the functionality of the compound on the other properties (e.g., degree of flexibility) of the resulting foam.

The flame-retarding agent can be used in an amount from about 1 to about 30 parts by weight per 100 parts by weight of the polyether polyol reactant, and is usually employed in an amount of at least about 5 parts by weight. It is evident that the particular amount of flame-retardant employed depends largely on the efficiency of any given agent in reducing flammability.

The polyether-based polyurethane foams of this invention may be formed in accordance with any of the processing techniques known to the art such as, in particular, the one-shot technique. In accordance with this method, foamed products are provided by carrying out the reaction of the polyisocyanate and polyether polyol simultaneously with the foaming operation. It is sometimes convenient to add the organosilicone polymer surfactant to the reaction mixture as a premixture with one or more of the blowing agent, polyether polyol, amine catalyst and, when used, the flame-retardant. It is to be understood that the relative amounts of the various components of the foam formulations are not narrowly critical. The polyether polyol and polyisocyanate are present in the foam-producing formulation in a major amount. The relative amounts of these two components is the amount required to produce the urethane structure of the foam and such relative amounts are well known in the art. The source of the blowing action such as water, auxiliary blowing agents, amine catalyst, metal co-catalyst and the organosilicone foam stabilizers of the present invention are each present in a minor amount necessary to achieve the function of the component. Thus, the blowing agent is present in an amount sufficient to foam the reaction mixture, the amine catalyst is present in a catalytic amount (i.e., an amount sufficient to catalyze the reaction to produce the urethane at a reasonable rate), and the organosilicone polymers of this invention are present in a foam-stabilizing amount, that is, in an amount sufficient to stabilize the foam. The preferred amounts of these various components are as given hereinabove.

If desired, other additional ingredients can be employed in minor amounts in producing the polyurethane foams in accordance with the process of this invention. Illustrative of such additives that can be employed are: cross-linking agents such as glycerol, triethanolamine and their oxyalkylene adducts, as well as fillers, dyes, pigments, anti-yellowing agents and the like. The polyurethanes produced in accordance with the present invention are used in the same areas as conventional flexible polyether polyurethanes and are especially useful where improved fire-resistance properties are beneficial. Thus, the foams of the present invention are used with advantage in the manufacture of textile interliners, cushions, mattresses, paddings, carpet underlay, packaging, gaskets, sealers, thermal insulators and the like.

The following examples are merely illustrative of the present invention and are not intended as a limitation upon the scope thereof.

Molecular weights given in the examples for various polymer compositions of this invention, were measured by Gel Permeation Chromatography (abbreviated in the examples as "GPC") using a calibration curve showing the relationship between the respective elution volumes established for dimethylsiloxane fluids of different molecular weights and the respective known molecular weights of such fluids. In establishing the calibration curve, the various dimethylsiloxane fluids were in solution in trichloroethylene solvent using styragel packed columns. In measuring the molecular weights of the polymers described herein, the elution volume observed for any particular polymer product (in trichloroethylene solvent) was equated with the corresponding elution volume of the calibration curve, and the molecular weight associated with that particular elution volume was assigned as the molecular weight of the polymer product. Gel Permeation Chromatography as a technique for measuring molecular weight is discussed in "Polymer Fractionation" (ed. Manfred J. R. Cantow, Academic Press, Inc. New York 1967), pages 123–173, Chapter B4, entitled "Gel Permeation Chromatography," by K. H. Altgelt and J. C. Moore. In determining the molecular weights given in the examples, the particular procedure employed was that described in the article entitled "Characterization of Silicones by Gel Permeation Chromatography" by F. Rodriguez et al. in *I & EC Product and Development*, Vol. 5, No. 2, page 121 (June 1966) using five styragel packed columns (Waters Associates, Inc.) having a pore size of $10^3$A, $3 \times 10^3$A, $10^4$A, $3 \times 10^4$A, and $8 \times 10^3$A, respectively.

It is to be understood that in the formulas included in the data which follows, "Me" designates a methyl group, $-CH_3$.

EXAMPLES 1–10

In accordance with these examples, 3-cyanopropyl-substituted polymethylpolysiloxane hydride fluids, designated in the examples as Si—H Fluids I-X, were prepared having the general formula:

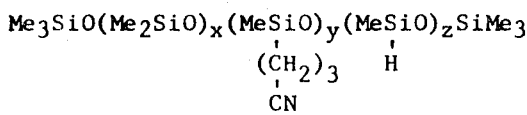

wherein the particular average values of $x$, $y$ and $z$ are given in Table I below. In Examples 2, 4 and 7, respective Fluids II, IV and VII were prepared by the acid-catalyzed equilibration of the following silicon-containing reactants as the source of the indicated units:

Reactant (1a): Hexamethyldisiloxane, $Me_3SiOSiMe_3$, as the source of the endblocking trimethylsiloxy units, $Me_3SiO$—.

Reactant (2): Cyclic polymers of dimethylsiloxane distilled to provide the cyclic tetramer, $[Me_2SiO]_4$, as the predominant component (boiling point, 175°C./760 mm. Hg), as the source of the dimethylsiloxy units.

Reactant (3): Cyclic 3-cyanopropylmethylsiloxane polymer, as the source of the 3-cyanopropylmethylsiloxy units. This reactant is prepared by the hydrolysis of 3-cyanopropylmethyldichlorosilane, $MeSiCl_2(CH_2)_3CN$, at a temperature of about 10°–15°C. and subatmospheric pressure (40–110 mm.) employing toluene diluent and neutralizing the hydrolyzate with sodium bicarbonate, followed by dehydration and cyclization of the hydrolyzate in the presence of sodium bicarbonate at reflux temperature, and removal of toluene from the cyclizate.

Reactant (4): Polymeric methylhydrogensiloxane (Si-H analysis, 355–365 cc. $H_2$ per gram), as the The of the methylhydrogensiloxy units, MeHSiO. The respective amounts of the aforesaid reactants (1a)–(4) and catalyst employed in providing, and analytical data pertaining to, Fluids II, IV and VII are given in Table I; the procedure and reaction conditions employed are as typically illustrated by the following detailed description of the preparation of Fluid II.

Preparation of Fluid II

The aforesaid Reactants (1a)–(4) were charged in the following amounts to a 250 ml. capacity, three-necked flask equipped with a thermometer, mechanical stirrer, condenser and nitrogen blow-by:

Reactant (1a): 1.62 grams, corresponding to 0.01 mol of $Me_3SiOSiMe_3$;

Reactant (2): 37.0 grams, corresponding to 0.5 mol-equivalent of the unit, $Me_2SiO$;

Reactant (3): 19.05 grams, corresponding to 0.15 mol-equivalent of the unit, $NC(CH_2)_3SiMeO$; and Reactant (4): 3.6 grams, corresponding to 0.06 mol-equivalent of the unit, MeHSiO.

The resulting heterogeneous mixture was stirred vigorously at room temperature while 0.122 grams of anhydrous trifluoromethyl sulfonic acid catalyst was added to the system, the said amount of catalyst corresponding to about 0.2 weight per cent of the total weight of reactants. After about two hours the mixture became homogeneous and was stirred for an additional 2hour period. The equilibrate was neutralized with sodium bicarbonate (20 grams), adding toluene (100 ml.) to facilitate filtration. The mixture was filtered and solvent removed by evaporation at 40°C./5 mm. Based upon the method and relative proportions of reactants employed, the fluid product, designated as Si—H Fluid II, is assigned the average structure,

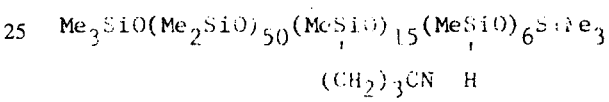

corresponding to a molecular weight of about 6127 and a theoretical MeHSiO content of 5.87 weight per cent. Upon Si—H analysis, the product provided 21.2 cc. $H_2$/gram on the basis of which the found MeHSiO content is 5.68 weight per cent.

Fluids I, III, V, VI and VII–X were prepared by the acid-catalyzed equilibration of Reactants (2), (3) and (4) employing, in place of Reactant (1a), the following:

Reactant (1b): Trimethylsiloxy endblocked dimethylsiloxy trimer, $Me_3SiO(Me_2SiO)_3SiMe_3$, as the source of the endblocking units and as a supplemental source of $Me_2SiO$ units.

The respective amounts of Reactant (1b) and the aforesaid Reactants (2)–(4) and catalyst employed in providing these particular fluids are also given in Table I under Examples 1, 3, 5, 6 and 8–10, the procedure and reaction conditions employed being as typically illustrated by the following detailed description of the preparation of Fluid III.

Preparation of Fluid III

A reaction mixture containing the following was prepared:

Reactant (1b): 230.4 grams, corresponding to 0.60 mol-equivalent of $Me_3SiOSiMe_3$ and about 1.8 mol-equivalents of $Me_2SiO$;

Reactant (2): 2086 grams, corresponding to about 28.2 mol-equivalents of the unit, $Me_2SiO$;

Reactant (3): 1143 grams, corresponding to 9 mol-equivalents of the unit, $NC(CH_2)_3SiMeO$;

Reactant (4): 216 grams, corresponding to 3.6 mol-equivalents of the unit, MeHSiO; and anhydrous trifluoromethylsulfonic acid (9.1 grams). The mixture was stirred 5 hours at room temperature after which the mixture became homogeneous. The equilibrate was neutralized with sodium bicarbonate (600 grams), mixed with toluene (600 grams) and then filtered. Based upon the method and proportions of reactants employed, the fluid product, designated as Si—H Fluid III, has the average formula,

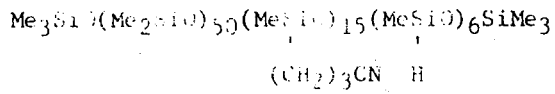

$$(CH_2)_3CN \quad H$$

corresponding to a molecular weight of 6127 and a theoretical MeHSiO content of 5.87 weight per cent. Upon Si—H analysis, the product provided 20.4 cc. of $H_2$/gram on the basis of which the MeHSiO content is 5.45 weight per cent.

In the following Table I, the weight percentages expressed as "% MeHSiO, Found" correspond to the Si—H analysis (cc. $H_2$ per gram) of the respective fluids produced in accordance with the above Examples 1–10, as defined by the conversion:

$$\text{Weight Percent MeHSiO Found} = \frac{\text{cc.}H_2 \text{ per gram}}{373.3} \times 100$$

where the factor 373.3 is the theoretical number of cubic centimeters of hydrogen provided per gram of fluid consisting of 100 per cent MeHSiO units (that is, 22,400 cc. of hydrogen divided by the unit molecular weight of 60). The weight percentages expressed as "% MeHSiO, Theoretical" correspond to the weight (60 z) contributed by the MeHSiO units divided by the calculated molecular weight of the fluid product times 100.

and the average number of oxypropylene units varies from about 27 to about 32. For convenience, the particular polyether reactants employed are designated as Polyethers A through G and have the respective average compositions given in Table II:

TABLE II

POLYETHER REACTANTS
General Formula: $MeO(C_3H_6O)_m(C_2H_4O)_nCH_2CH=CH_2$

| Polyether | Allyl Analysis /1/ | Molecular Weight /2/ | m | n |
|---|---|---|---|---|
| A | 1.31 | 3130 /3/ | 30.6 | 29.2 |
| B | — | 2600 /4/ | 29 | 20 |
| C | 1.42 | 2887 /4/ | 31.5 | 22.4 |
| D | 1.46 | 2808 /3/ | 27.4 | 26.1 |
| E | 1.43 | 2867 /3/ | 27.9 | 26.7 |
| F | 1.38 | 2971 /5/ | 30 | 26.4 |
| G | 1.42 | 2887 /3/ | 28.1 | 26.9 |

/1/ Weight percent.
/2/ Based on allyl analysis.
/3/ Oxyethylene content = about 42 weight percent.
/4/ Oxyethylene content = about 35 weight percent.
/5/ Oxyethylene content = about 40 weight percent.

In accordance with Examples 11–22, polyoxyalkylene-polysiloxane block copolymers of the invention, designated as Surfactants A through L were prepared by the platinum-catalyzed hydrosilation of Polyethers A-F with the 3-cyanopropyl-substituted polymethyl-

TABLE I

Preparation of 3-Cyanopropyl-Substituted Si-H Fluids Having the General Formula, $$Me_3SiO(Me_2SiO)_x\left[\begin{array}{c}MeSiO\\|\\(CH_2)_2CN\end{array}\right]_y\left[\begin{array}{c}MeSiO\\|\\H\end{array}\right]_z SiMe_3,$$ where Me represents methyl and the average values of x, y, and z are as given below.

| EXAMPLE NO. | | 1 | 2 | 3 | 4 | 5 | 6 | 7 | 8 | 9 | 10 |
|---|---|---|---|---|---|---|---|---|---|---|---|
| Si-H FLUID DESIGNATION | | I | II | III | IV | V | VI | VII | VIII | IX | X |
| REACTANTS | | | | | | | | | | | |
| $Me_3SiOSiMe_3$: | grams | — | 1.62 | — | 9.72 | — | — | 3.24 | — | — | — |
| | mols | — | 0.01 | — | 0.06 | — | — | 0.02 | — | — | — |
| $Me_3SiO(Me_2SiO)_3SiMe_3$: | grams | 11.5 | — | 230.4 | — | 11.5 | 11.5 | — | 11.5 | 11.5 | 11.5 |
| | mols | 0.03 | — | 0.60 | — | 0.03 | 0.03 | — | 0.03 | 0.03 | 0.03 |
| $Me_2SiO$: | grams /1/ | 93.4 | 37.0 | 2086 | 222 | 115.6 | 126.7 | 88.8 | 126.7 | 126.7 | 126.7 |
| | mol-eq. | 1.26 | 0.5 | 28.2 | 3.0 | 1.71 | 1.71 | 1.2 | 1.71 | 1.71 | 1.71 |
| $NC(CH_2)_3SiMeO$: | grams /2/ | 76.3 | 19.05 | 1143 | 114.3 | 38.1 | 19.1 | 24.54 | 38.1 | 38.1 | 11.4 |
| | mol-eq. | 0.60 | 0.15 | 9.0 | 0.90 | 0.30 | 0.15 | 0.19 | 0.30 | 0.30 | 0.09 |
| MeHSiO: | grams /3/ | 10.8 | 3.6 | 216 | 21.6 | 10.8 | 9.35 | 6.6 | 10.8 | 10.8 | 9.35 |
| | mol-eq. | 0.18 | 0.06 | 3.6 | 0.36 | 0.18 | 0.156 | 0.11 | 0.18 | 0.18 | 0.156 |
| $CF_3SO_3H$ Catalyst, | Weight % | 0.75 | 0.2 | 9.1 /4/ | 0.2 | 0.5 | 0.5 | 0.8 /4/ | 0.5 | 0.5 | 0.75 |
| Si-H FLUID PRODUCT | | | | | | | | | | | |
| Structure Based on Method | | | | | | | | | | | |
| Molecular Weight | | 6392 | 6127 | 6127 | 6127 | 5862 | 5549 | 6202 | 6232 | 6232 | 5295 |
| x (average) | | 45 | 50 | 50 | 50 | 55 | 60 | 60 | 60 | 60 | 60 |
| y (average) | | 20 | 15 | 15 | 15 | 10 | 5 | 10 | 10 | 10 | 3 |
| z (average) | | 6 | 6 | 6 | 6 | 6 | 5.2 | 5.5 | 6 | 6 | 5.2 |
| Si-H Analysis | | | | | | | | | | | |
| cc. $H_2$/gram: Found | | 20.6 | 21.2 | 20.4 | 20.2 | 22.7 | 20.8 | 20.2 | 21.1 | 20.9 | 20.55 |
| % MeHSiO: Found /5/ | | 5.52 | 5.68 | 5.46 | 5.41 | 6.08 | 5.57 | 5.41 | 5.65 | 5.60 | 5.50 |
| Theoretical | | 5.63 | 5.87 | 5.87 | 5.87 | 6.14 | 5.62 | 5.32 | 5.77 | 5.77 | 5.89 |
| Viscosity, centistokes | | 479 | — | — | 300 | 204 | 120 | — | 199 | 207 | 83 |

/1/ Grams used of Reactant (2), corresponding to the indicated mol-equivalents of the unit, $Me_2SiO$;
/2/ Grams used of Reactant (3), corresponding to the indicated mol-equivalents of the unit, $NC(CH_2)_3SiMeO$.
/3/ Grams used of Reactant (4), corresponding to the indicated mol-equivalents of the unit, MeHSiO.
/4/ Actual grams of catalyst employed.
/5/ Corresponding to the cc. $H_2$/gram found.

In preparing Surfactants A through P as described in accordance with the following Examples 11–26, respectively, the polyether reactants employed were allyl-started poly(oxyethylene-oxypropylene) ethers capped with a methyl group, containing a small percentage (up to about 10 mol per cent) of hydroxyl-terminated polyether chains due to incomplete methyl capping of the allyl-endblocked polyether intermediate. The average number of oxyethylene units in these polyether reactants varies from about 20 to about 30 polysiloxane hydride fluids identified in Table I hereinabove, namely, Si—H Fluids I-X. In describing the preparation of the surfactants, the indicated mol-equivalents of MeHSiO corresponding to the amount of Si—H fluid reactant employed are based on the % MeHSiO, Found values of the fluids given in Table I. For convenience, the average structure of Surfactants A-L, based upon the relative proportions of monomeric precursors employed, are given in Table III which follows Example 26.

EXAMPLE 11

Preparation of Surfactant A

A mixture was prepared containing: Si—H Fluid I in an amount of 25 grams (about 0.023 mol-equivalent MeHSiO); Polyether A in an amount of about 79 grams which includes about a 9.7 weight per cent excess over the stoichiometric amount of polyether reactant required to react completely with the Si—H groups of Fluid I; and 100 ml. of xylene solvent. The mixture was heated rapidly to 85°C. with stirring and while at that temperature 75 p.p.m. of Pt catalyst as chloroplatinic acid was added thereto. The reaction mixture was heated at 95°C. for 5 hours after which a standard test (fermentation tube technique involving the use of KO—H—$C_2H_5OH$—$H_2O$ solution) indicated the presence of less than 5 weight per cent of unreacted Si—H. The reaction mixture was then cooled to room temperature, neutralized with sodium bicarbonate, filtered and desolvated by rotary vacuum stripping at 50°C./5 mm. The product (97.5 grams) was a clear liquid having a Brookfield viscosity (at 25°C.) of 1360 centipoise, and is designated herein as Surfactant A. Based upon the relative proportions of monomeric precursors employed, the average composition of Surfactant A is as given in Table III.

EXAMPLE 12

Preparation of Surfactant B

A mixture was prepared containing: Si—H Fluid II (12.8 grams; 0.012 mol-equivalent MeHSiO); 42.3 grams of Polyether B corresponding to 0.012 mol (31.2 grams) plus 35 weight per cent (11.1 grams) in excess of stoichiometry; and xylene (50 ml.) solvent. The mixture was heated rapidly to 85°C. with constant stirring and, while at that temperature, 25 p.p.m. Pt as chloroplatinic acid was added thereto. Due to the exothermic nature of the reaction, the temperature increased to 95°C. The reaction mixture was maintained at 85°–95°C. for 1 hour and then at about 140°C. for one hour. After this period of time, a test for the presence of Si—H by the fermentation tube technique was negative. The reaction mixture was then cooled to room temperature, neutralized with sodium bicarbonate, filtered and solvent removed by rotary evaporation at 50°C./3 mm. The product (53.2 grams), designated herein as Surfactant B, was a clear amber liquid having a molecular weight (G.P.C.) of 25,000 ($\bar{M}_N$), and has the average composition given in Table III.

EXAMPLE 13

Preparation of Surfactant C

The reaction of Example 12 was repeated employing the same reactants and amounts thereof and following substantially the same procedure, except that Polyether C was employed as the polyether reactant and the amount thereof (42.3 grams) corresponded to about 22 weight per cent in excess of stoichiometry. The liquid reaction product, designated herein as Surfactant C, had a molecular weight (G.P.C.) of 24,000 ($\bar{M}_N$) and, upon analysis, was found to contain 7.4 and 0.76 weight per cent Si and N, respectively. Based upon the relative proportions of monomeric reactants employed, Surfactant C is assigned the average structure given in Table III.

EXAMPLE 14

Preparation of Surfactant D

A 10-liter capacity, three-necked flask equipped with a mechanical stirrer, condenser, thermometer and a nitrogen blow-by was charged with: Si—H Fluid III in an amount of 1280 grams (1.165 mol-equivalents of MeHSiO); 4230 grams of Polyether D corresonding to 1.506 mols which represents a 29 weight per cent excess; and 1000 grams of xylene. The temperature of the reaction mixture was brought to 85°C. and while at that temperature, 25 p.p.m. Pt as chloroplatinic acid was added thereto. The reaction mixture was kept at 85°–95°C. for 1 hour and was then refluxed for 1 hour at 138°C. After this period of time, the standard test for residual Si—H was negative. The reaction mixture was then cooled to room temperature, neutralized with sodium bicarbonate (50 grams), filtered, and solvent removed by rotary evaporation at 50°C./5 mm. As determined analytically, the liquid reaction product had a Brookfield viscosity (at 25°C.) of 1160 centipoise, a G.P.C. molecular weight ($\bar{M}_N$) of 24,000, 0.74 weight per cent N and an Si content of 7.18 (average of two determinations). Based upon the relative proportions of monomeric precursors employed, the product, designated herein as Surfactant D, has the average composition given in Table III.

EXAMPLE 15

Preparation of Surfactant E

The reaction of Example 14 was repeated employing the same reactants and amounts thereof and following substantially the same procedure, to provide a reaction product having the same average composition as Surfactant D. Upon analysis, the product was found to contain 0.71 weight per cent N and an Si content of 7.14 (average of two determinations), and is included in Table III as Surfactant E.

EXAMPLE 16

Preparation of Surfactant F

A 2-liter flask equipped with a mechanical stirrer was charged with 153.6 grams of Si—H Fluid IV (0.138 mol-equivalent MeHSiO); Polyether E in an amount of 507.6 grams (0.177 mol) which includes about 28 weight per cent in excess of stoichiometry; and 600 grams of xylene solvent. While at 80°–90°C., 300 p.p.m. Pt was added as chloroplatinic acid and the mixture was heated at this temperature for one hour followed by refluxing until a negative test for Si—H was obtained. After cooling, neutralization, filtration and solvent removal, the liquid product was found to contain 6.93 and 0.83 weight per cent Si and N, respectively. The product is designated herein as Surfactant F and has the average composition given in Table III.

EXAMPLE 17

Preparation of Surfactant G

A mixture was prepared containing: Si—H Fluid V in an amount of 25 grams (about 0.025 mol-equivalent MeHSiO); Polyether A in an amount of about 86 grams which includes about a 10 weight per cent excess over the stoichiometric amount required to react completely with the Si-H groups of Fluid V; and 100 ml. of xylene solvent. The mixture was heated rapidly to 85°C. with stirring and while at that temperature 50 p.p.m. of Pt catalyst as chloroplatinic acid was added thereto. The reaction mixture was heated at 95°C. for 2 hours after which the standard test for Si—H indicated less than 5 weight per cent of residual Si—H. The reaction mixture was then cooled to room temperature, neutralized with sodium bicarbonate, filtered and desolvated by rotary vacuum stripping at 50°C./5 mm. The product (107.5 grams) was a clear liquid having a Brookfield viscosity (at 25°C.) of 1430 centipoise. Based upon the relative proportions of reactants employed, the product which is designated herein as Surfactant G has the average composition given in Table III.

EXAMPLE 18

Preparation of Surfactant H

A mixture was prepared containing: Si—H Fluid VI in an amount of 25 grams (about 0.023 mol-equivalent MeHSiO); Polyether A in an amount of about 80 grams which includes about 10 weight per cent in excess of the stoichiometric amount required to react completely with the Si—H groups of Fluid VI; and 100 ml. of xylene solvent. The mixture was heated to 84°C. with mechanical stirring and while at that temperature 50 p.p.m. of Pt catalyst as chloroplatinic acid was added thereto. The reaction mixture was heated at 95°C. for 2.5 hours after which the presence of less than 5 weight per cent residual Si-H was indicated. The reaction mixture was then cooled to room temperature, neutralized with sodium bicarbonate (15 grams), filtered and desolvated by rotary vacuum stripping at 50°C./5 mm. The product (98 grams) was a clear liquid having a Brookfield viscosity (at 25°C.) of 1180 centipoise. The product is designated herein as Surfactant H and has the average composition given in Table III.

EXAMPLE 19

Preparation of Surfactant I

A mixture was prepared containing: Si—H Fluid VII in an amount of 20.8 grams (0.0187 mol-equivalent MeHSiO); Polyether A in an amount of 65 grams which includes about 11 weight per cent in excess of the stoichiometric amount required to react completely with the Si—H groups of Fluid VII; and 40 grams of xylene solvent. The mixture was heated to 85°C. with stirring and while at that temperature 10 p.p.m. of Pt catalyst as chloroplatinic acid was added thereto. The reaction mixture was heated at 90°C. for 2 hours after which a test for the presence of residual Si—H was negative. The reaction mixture was then cooled to room temperature, neutralized with sodium bicarbonate, filtered and desolvated by rotary vacuum stripping at 50°C./5 mm. The product (78.9 grams) was a clear liquid and is designated herein as Surfactant I. Based upon the relative proportions of monomeric precursors employed, Surfactant I is assigned the average structure given in Table III.

EXAMPLE 20

Preparation of Surfactant J

A mixture was prepared containing: Fluid VIII in an amount of 25 grams (about 0.0235 mol-equivalent MeHSiO); Polyether A in an amount of about 80 grams which includes about 9 weight per cent in excess of the stoichiometric amount required to react completely with the Si—H groups of Fluid VIII; and 100 ml. of xylene solvent. The mixture was heated rapidly to 85°C. with stirring and while at that temperature 75 p.p.m. of Pt catalyst as chloroplatinic acid was added thereto. The reaction mixture was heated for 5.5 hours at 100°C. after which the standard test for Si—H indicated the presence of less than 5 weight per cent of unreacted Si—H. The reaction mixture was then cooled to room temperature, neutralized with sodium bicarbonate, filtered and desolvated by rotary vacuum stripping at 50°C./5 mm. The product (98.0 grams) was a clear liquid having a Brookfield viscosity (at 25°C.) of 1400 centipoise. Based upon the relative proportions of reactants employed, the product has the average composition given in Table III for Surfactant J.

EXAMPLE 21

Preparation of Surfactant K

A mixture was prepared containing: Si-H Fluid IX in an amount of 25 grams (about 0.0233 molequivalent MeHSiO); Polyether A in an amount of about 80 grams which includes about 10 weight per cent in excess of the stoichiometric amount required to react completely with the Si—H groups of Fluid IX; and 100 ml. of xylene solvent. The mixture was heated to 84°C. with mechanical stirring and while at that temperature 50 p.p.m. of Pt catalyst as chloroplatinic acid was added thereto. The reaction mixture was heated at 95°C. for 2.3 hours after which the presence of less than 5 weight per cent residual Si—H was indicated. The reaction mixture was then cooled to room temperature, neutralized with sodium bicarbonate (15 grams), filtered and desolvated by rotary vacuum stripping at 50°C./5 mm. The product (100 grams) was a clear liquid having a Brookfield viscosity (at 25°C.) of 1490 centipoise. The product is designated herein as Surfactant K and has the average composition given in Table III.

EXAMPLE 22

Preparation of Surfactant L

A mixture was prepared containing: Fluid X in an amount of 25 grams (about 0.0229 mol-equivalent MeHSiO); Polyether F in an amount of 94.3 grams which includes a 38.6 weight per cent excess over the stoichiometric amount required to react completely with the Si—H groups of Fluid X; and 100 ml. of xylene solvent. The mixture was heated to 84°C. with stirring and while at that temperature 50 p.p.m. Pt as $H_2PtCl_6$ was added thereto. The temperature of the mixture was raised to 95°C. and was maintained at 95°C. until the total catalyzed period was 35 minutes. After 30 minutes of this period, the standard test for residual Si—H was negative. The reaction mixture was cooled to room temperature, neutralized with sodium bicarbonate, filtered and desolvated by rotary vacuum stripping. The product (115 grams) was a clear fluid having a Brookfield viscosity (at 25°C.) of 1450 centipoise. The product is designated herein as Surfactant L and has the average composition given in Table III.

The following Examples 23–26 illustrate the preparation of the organosilicone polymer surfactants of this invention by the addition of silicon-bonded hydrogen of polymethylpolysiloxane hydride fluids to the respective allyl groups of the polyether reactant and allyl cyanide. The polymer products of Examples 23–26 are designated herein as surfactants M through P, respectively, and their average structure is also given in Table III which follows Example 26.

EXAMPLE 23

Preparation of Surfactant M

The polyhydropolymethylpolysiloxane fluid employed in this example has the average structure, $Me_3SiO(Me_2SiO)_{63}(MeHSiO)_{16}SiMe_3$ which, upon Si-H analysis, provided 61.9 cc. $H_2$/gram, corresponding to an MeHSiO content of 16.5 weight per cent. This fluid, in an amount of 57.84 grams (0.159 mol-equivalent of MeHSiO), was mixed with toluene (80 ml.) and Polyether B (identified in Table II) in a total amount of 171.6 grams which includes a 10 weight per cent excess over the desired stoichiometric amount of 0.06 mol. This mixture was heated at 80°C. and, while at that temperature, 20 p.p.m. platinum as chloroplatinic acid was added thereto. After one hour of reaction time and while maintaining the reaction temperature at 80°–90°C., allyl cyanide was slowly added to the mixture over a period of 20 minutes in a total amount (13.4 grams) sufficient to provide about 100 weight per cent in excess of the desired stoichiometric amount of 0.099 mol. When the allyl cyanide was completely added, the reaction mixture was maintained at 80°C. for an additional 1.5 hours. After this period of time, the standard determination for the presence of unreacted Si—H groups was negative. The reaction mixture was then cooled, neutralized with sodium bicarbonate and filtered. After removal of solvent and excess allyl cyanide by rotary evaporation (50°C./1 mm.), 231 grams of liquid product was provided. The molecular weight (G.P.C.) of the product was 25,000. Based on the structure of the reactants and the relative stoichiometric amounts employed, the product, designated herein as Surfactant M, is assigned the average composition shown in Table III.

EXAMPLE 24

Preparation of Surfactant N

The procedure of Example 23 was repeated using: (1) a polyhydropolymethylpolysiloxane fluid having the average structure, $Me_3SiO(Me_2SiO)_{50}(MeHSiO)_{2.5}SiMe_3$ (Si-H analysis: 102.9 cc. $H_2$/gram, corresponding to 27.6 weight per cent MeHSiO), in an amount of 26.5 grams (0.1218 mol-equivalent of MeHSiO); (2) xylene (100 ml.) as the solvent; (3) Polyether B in a total amount of 126 grams to provide a 42 weight per cent excess over the stoichiometric amount required to react with 0.034 molequivalent of MeHSiO; (4) 100 p.p.m. Pt; and (5) allyl cyanide in an amount of 5.5 grams. The liquid product (148.0 grams) had a molecular weight (G.P.C.) of 26,000 and, upon analysis, was found to contain 6.4 weight per cent silicon and 0.74 weight per cent nitrogen. The polymer product of this example is designated herein as Surfactant N and is assigned the average composition given in Table III.

EXAMPLE 25

Preparation of Surfactant O

The polyhydropolymethylpolysiloxane fluid employed in this example has the average structure, $Me_3SiO(Me_2Sio)_{50}(MeHSiO)_{25}SiMe_3$, and upon Si—H analysis provided 102.9 cc. $H_2$/gram, corresponding to 27.6 weight per cent MeHSiO. This fluid in an amount of 53.0 grams (0.243 mol-equivalent of MeHSiO) was mixed with 300 grams of xylene, and Polyether C (identified in Table II) in a total amount of 236.6 grams which includes about a 20 weight per cent excess over the stoichiometric amount (0.068 mol) required to react with 28 per cent of available MeHSiO units. This mixture was stirred for 0.5 hour at 80°C. after which platinum (50 p.p.m.) as $H_2PtCl_6$ was added. The mixture was then stirred for an additional 2 hours after which allyl cyanide was added in a total amount of 16.5 grams which includes a 41 weight per cent excess over the desired stoichiometric amount of 0.175 mol. The resulting reaction mixture was allowed to reflux for 7.5 hours at the boiling point of xylene, after which the mixture was cooled, neutralized with sodium bicarbonate, filtered, and excess allyl cyanide and solvent removed by rotary evaporation. The liquid polymer product had a molecular weight (G.P.C.) of 28,000 and, upon analysis, was found to contain 6.93 weight per cent silicon and 0.9 weight per cent nitrogen. The polymer of this example is designated herein as Surfactant O and, based upon the relative proportions of reactants employed, is assigned the average composition given in Table III.

EXAMPLE 26

Preparation of Surfactant P

The procedure of Example 25 was repeated employing the indicated reactants, catalyst and solvent and reaction conditions, except that: Polyether G (identified in Table II) was employed in place of Polyether C; and after the addition of allyl cyanide, the reaction mixture was heated at 138°C. for 45 minutes instead of refluxing for 7.5 hours. The liquid reaction product has a molecular weight (G.P.C.) of 28,000 and, upon analysis, was found to contain 6.6 weight per cent silicon and 0.73 weight per cent nitrogen. The polymer product is designated herein as Surfactant P and, based upon the reactants and relative proportions employed, is assigned the average structure given in Table III which follows.

TABLE III

Surfactants A-P Having the General Formula

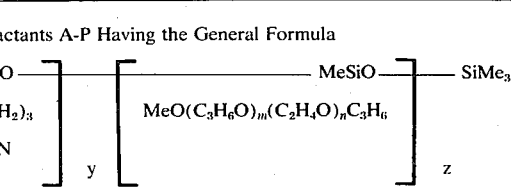

where Me represents a methyl group and the average values of x, y, z, m and n are given below.

| Example | Surfactant | x | y | z | m | n |
|---|---|---|---|---|---|---|
| 11 | A | 45 | 20 | 6 | 30.6 | 29.2 |

TABLE III — Continued

Surfactants A-P Having the General Formula

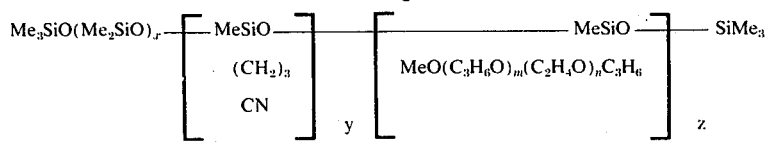

where Me represents a methyl group and the average values of x, y, z, m and n are given below.

| Example | Surfactant | x | y | z | m | n |
|---|---|---|---|---|---|---|
| 12 | B | 50 | 15 | 6 | 29 | 20 |
| 13 | C | 50 | 15 | 6 | 31.5 | 22.4 |
| 14 | D | 50 | 15 | 6 | 27.4 | 26.1 |
| 15 | E | 50 | 15 | 6 | 27.4 | 26.1 |
| 16 | F | 50 | 15 | 6 | 27.9 | 26.7 |
| 17 | G | 55 | 10 | 6 | 30.6 | 29.2 |
| 18 | H | 60 | 5 | 5.2 | 30.6 | 29.2 |
| 19 | I | 60 | 10 | 5.5 | 30.6 | 29.2 |
| 20 | J | 60 | 10 | 6 | 30.6 | 29.2 |
| 21 | K | 60 | 10 | 6 | 30.6 | 29.2 |
| 22 | L | 60 | 3 | 5.2 | 30 | 26.4 |
| 23 | M | 63 | 10 | 6 | 29 | 20 |
| 24 | N | 50 | 18 | 7 | 29 | 20 |
| 25 | O | 50 | 18 | 7 | 31.5 | 22.4 |
| 26 | P | 50 | 18 | 7 | 28.1 | 26.9 |

EXAMPLES 27–40

In accordance with these examples, flexible polyether polyurethane foams were produced using the above-described Surfactants A through J and M–P of the present invention as the respective foam-stabilizing surfactant component of the foam-producing reaction mixture, designated herein as Foam Formulation A, which had the following composition:

Foam Formulation A was also used as the reaction mixture for providing flexible polyether polyurethane foams stabilized with other surfactants, designated herein as Surfactants AA, BB and CC, which are not within the scope of the present invention. These particular surfactants were used in comparative Run Nos. C-1 through C-4, and are identified below:

Surfactant AA is a polyoxylakylene-polysiloxane block copolymer having the following average composition, wherein the polyoxyalkylene block is derived from Polyether B of Table II:

TABLE IV

| FOAM FORMULATION A | | |
|---|---|---|
| Component | Parts By Weight | Grams |
| Polyether Polyol having a hydroxyl number of 56 produced by reacting glycerol and propylene oxide | 100 | 350 |
| Tolylene Diisocyanate (Index 105) /1/ | 49.73 | 174 |
| Tris(2-chloroethyl)phosphate | 10 | 35 |
| Water | 4 | 14 |
| Bis[2-(N,N-dimethylamino)ethyl] ether employed as a 70 weight per cent solution in dipropylene glycol | 0.1 | 0.35 |
| Stannous Octoate | 0.35 | 1.225 |
| Surfactant | Varied /2/ | |

/1/ This component was a mixture of the 2,4- and 2,6- isomers of tolylene diisocyanate present in a weight ratio of 80:20, respectively. Index 105 designates that the amount of mixture employed was 105 weight percent of the stoichiometric amount required to react with total reactive hydrogens from the polyether polyol and water present in the foam formulation.
/2/ For specific proportions employed, refer to Table V herein.

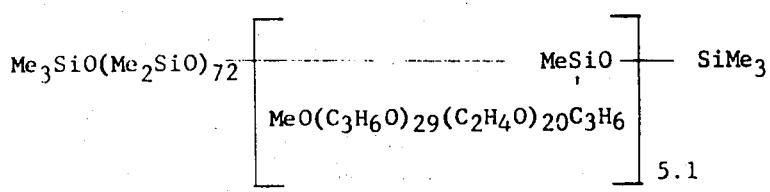

In Run No. C-1, Surfactant AA was used as such in undiluted form, that is, as a 100 per cent active stream. In Run Nos. C-2a and C-2b, Surfactant AA was employed as a solution containing 55 weight per cent of Surfactant AA (that is, 55 weight per cent active) and 45 weight per cent of a solvent mixture consisting of 90 weight per cent of the butanol-started polyether monool having the average formula, $C_4H_9O(C_2H_4O)_{11}(C_3H_6O)_8H$, and 10 weight per cent of an ethylene oxide adduct of nonylphenol having the average structure, $C_9H_{19}C_6H_4O(C_2H_4O)_{10.5}H$.

Surfactant BB is a polyoxyalkylene-polysiloxane block copolymer having the following average structure, wherein the polyoxyalkylene block is derived from Polyether B of Table II:

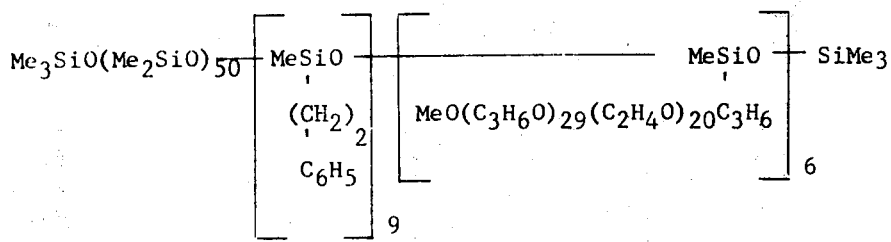

and was employed as a 55 weight per cent solution (that is, in 55 per cent active form) in the aforesaid solvent mixture containing 90 and 10 weight per cent of $C_4H_9O(C_2H_4O)_{11}(C_3H_6O)_8H$ and $C_9H_{19}C_6H_4O(C_2H_4O)_{10.5}{}^H$, respectively.

Surfactant CC is a hydrolyzable polyoxyalkylene-polysiloxane block copolymer having the following average structure, wherein the polyoxyalkylene block is derived from a butanol-started, hydroxyl-terminated poly(oxythylene-oxypropylene) ether:

$MeSi[(OSiMe_2)_{6.4}(OC_2H_4)_{19}(OC_3H_6)_{14}OC_4H_9]_3$

Surfactant CC was employed in undiluted (that is, 100 per cent active) form.

General Foaming Procedure

The manipulative steps involved in preparing the foams of Examples 27 to 40 and comparative Runs C-1 to C-4 are as follows: After dispensing the polyether polyol in a container (Lily Cup No. 32TN6), the flame-retardant is added thereto and dispersed therein with a spatula. The surfactant is then added from a syringe and is also dispersed with a spatula. After inserting a baffle, a premixture of the amine catalyst and water is added but not dispersed. The container containing the polyether polyol-flame retardant-surfactant-amine-water mixture is then placed on a drill press and the mixture agitated 15 seconds at 2000 revolutions per minute, after which the stannous octoate co-catalyst is added from a syringe. After mixing for an additional 8 seconds, the diisocyanate reactant is added rapidly and the agitation is continued for another 7 seconds. After the mixing cycle, the mixture is poured into a parchment-lined box (12 × 12 × 12inches) supported by a wooden mold. The foam is allowed to rest in the mold for at least 3 minutes and is then cured for 15 minutes at 130°C. After cutting, rise of the foam is measured and foam samples prepared for breathability and burning extent.

As used herein, "breathability," "burning extent," "B" and "SE" have the following meanings:

Breathability denotes the porosity of a foam and is roughly proportional to the number of open cells in a foam. In accordance with the NOPCO test procedure described by R. E. Jones and G. Fesman, "Journal of Cellular Plastics," January, 1965, breathability was measured as follows: A 2 × 2 × 1 inch piece of foam is cut from near the center of the bun. Using a Nopco Foam Breathability Tester, Type GP-2 Model 40GD10, air is drawn through the one inch portion at a pressure differential of 0.5 inches of water less than atmospheric pressure. The air flow is parallel to the direction of original foam rise. The degree of openness of the foam (or foam breathability) is measured by air flow and is expressed as standard cubic feet per minute (SCFM).

Burning Extent denotes the burned length in inches of a test specimen of foam as measured in accordance with standard flammability test procedure ASTM-D-1692-68.

SE indicates that, on the basis of the aforesaid flammability test, the burning extent of the foam sample was less than 5.0 inches, thereby qualifying the foam for a self-extinguishing (SE) rating.

B denotes that, on the basis of the aforesaid flammability test, the burning extent of the foam sample was 5.0 inches or greater and thus did not qualify as a self-extinguishing material; therefore, the foam is assigned a burning (B) rating.

The results of Examples 27—40 and comparative Runs C-1 to weight 4are given in the following Table V wherein the concentration of surfactant employed is expressed on the basis of parts by weight per 100 parts by weeight of the polyether polyol reactant, abbreviated herein as "p.h.p."

TABLE V

Stabilization of Foams Using Surfactants of Average Structure

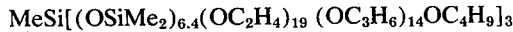
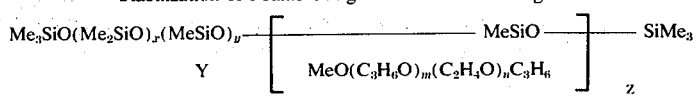

where Y is $-(CH_2)_3CN$ in Surfactants A-J and M-P, $(CH_2)_2C_6H_5$ in Surfactant BB, and the average values of x, y and z are as defined below.

| EXAMPLE | SURFACTANT | x | y | z | Concentration (p.h.p.) | Rise (inches) | FOAM Breathability (SCFM) | Burning Extent (inches) |
|---|---|---|---|---|---|---|---|---|
| 27-1 | A | 45 | 20 | 6 | 1.0 | 7.1 | 3.2 | 2.1 |

TABLE V—Continued

Stabilization of Foams Using Surfactants of Average Structure

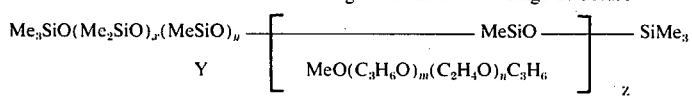

where Y is —$(CH_2)_3CN$ in Surfactants A-J and M-P, $(CH_2)_2C_6H_5$ in Surfactant BB, and the average values of x, y and z are as defined below.

| EXAMPLE | SURFACTANT | | | | Concentration (p.h.p.) | Rise (inches) | FOAM Breathability (SCFM) | Burning Extent (inches) |
|---|---|---|---|---|---|---|---|---|
| | | x | y | z | | | | |
| 27-2 | | | | | 0.5 | 6.8 | 3.2 | 2.9 |
| 28 /1/ | B | 50 | 15 | 6 | 1.0 | 38.1 | 4.0 | 2.4 |
| 29 | C | 50 | 15 | 6 | 1.0 | 7.3 | 4.0 | 2.3 |
| 30 | D | 50 | 15 | 6 | 1.0 | 7.6 | 4.2 | 2.1 |
| 31-1 | E | 50 | 15 | 6 | 1.0 | 7.6 | 4.1 | 2.1 |
| 31-2 | | | | | 0.5 | 7.0 | 3.7 | 2.2 |
| 32 | F | 50 | 15 | 6 | 1.0 | 7.7 | 5.8 | 2.4 |
| 33-1 | G | 55 | 10 | 6 | 1.0 | 7.4 | 1.7 | 2.4 |
| 33-2 | | | | | 0.5 | 7.3 | 4.3 | 2.3 |
| 34-1 | H | 60 | 5 | 5.2 | 0.6 | 7.7 | 1.8 | 2.4 |
| 34-2 | | | | | 0.3 | 7.6 | 2.2 | 2.5 |
| 35 | I | 60 | 10 | 5.5 | 1.0 | 7.5 | 4.3 | 2.3 |
| 36-1 | J | 60 | 10 | 6 | 0.5 | 7.4 | 3.1 | 2.2 |
| 36-2 | | | | | 0.3 | 7.2 | 2.7 | 2.1 |
| 37 | M | 63 | 10 | 6 | 1.0 | 7.4 | 4.2 | 2.4 |
| 38 | N | 50 | 18 | 7 | 1.0 | 7.3 | 4.0 | 1.6 |
| 39 | O | 50 | 18 | 7 | 1.0 | 7.3 | 2.8 | 2.4 |
| 40 | P | 50 | 18 | 7 | 1.0 | 7.5 | 5.0 | 2.2 |
| RUN NO. | | | | | | | | |
| C-1 | *AA | 72 | 0 | 5.1 | 0.3 | 7.1 | 4.0 | 4.2 |
| C-2a | *AA+ | 72 | 0 | 5.1 | 1.0 | 7.6 | 2.9 | 5.0 |
| C-2b | *AA+ | | | | 0.6 | 7.6 | 3.1 | 3.6 |
| C-3 | *BB+ | 50 | 9 | 6 | 1.0 | 7.1 | 5.1 | 2.4 |
| C-4a | *CC | — | /2/ | — | 1.0 | 7.3 | 5.0 | 5.0 |
| C-4b | *CC | | | | 0.8 | 7.6 | 3.3 | 3.6 |

*Not a surfactant of the invention.
+Surfactant employed as 55 weight per cent active solution.
/1/ Carried out on five times the scale of Formulation A of Table IV.
/2/ Surfactant has the average structure, $[C_4H_9O(C_3H_6O)_{14}(C_2H_4O)_{19}(Me_2SiO)_{6.4}]_3SiMe$.

The data of Table V show that the cyanopropyl-substituted polysiloxane-polyoxyalkylene block copolymers of this invention are effective stabilizers of flexible urethane foams and offer the further advantage of allowing for the formation of flame-retarded foams of significantly lower flammability than foams stabilized with block copolymers wherein the silicon atoms of the siloxane backbone are bonded only to methyl groups as in Surfactants AA and CC. Thus, the foams produced in comparative Runs C-1 and C-2b wherein Surfactant AA was used at a concentration of 0.3 and 0.33 p.h.p. had burning extents of 4.2 and 3.6 inches, respectively, wherein the foams produced in Examples 34-2 and 36-2 in which Surfactants H and J were used, also at 0.3 p.h.p., had burning extents of only 2.5 and 2.1 inches. Foams stabilized at higher surfactant concentrations of 0.5 to 0.6 p.h.p. were also significantly less flammable when stabilized with the surfactants of this invention than with Surfactant AA as shown by comparison of the burning extents (2.9 to 2.2 inches) of the foams produced in Example 27-2, 31-2, 33-2, 34-1 and 36-1, with the burning extent (5.0 inches) of the foam produced in Run C-2a. The data of Table V further show the markedly lower flammability of the foams produced with each of Surfactants A-J and M-P at concentrations of 0.3 to 1.0 p.h.p. as compared with Surfactant CC employed at 1.0 and 0.8 p.h.p. in Run Nos. C-4a and C-4b. Although the data also indicate that surfactants of this invention allow for the formation of flame-retarded foams having burning extents which compare favorably with those observed for foams stabilized with Surfactant BB in which the siloxane backbone is modified with phenylethyl groups, the surfactants of this invention are more potent than Surfactant BB, as shown by the data of Table VIII hereinbelow.

EXAMPLES 41–44

In accordance with these examples, a series of foams were formed employing the cyano-substituted polysiloxane-polyoxyalkylene block copolymers of the invention as the foam stabilizing component of Foam Formulation A identified in Table IV. A control foam, stabilized with the above-identified Surfactant AA (Run No. C-5), was also prepared. In Examples 41 and 43, the foam stabilizers were Surfactants L and H produced as described under Examples 22 and 18 and having, as shown in Table III, an average of three and five 3-cyanopropylmethylsiloxy units, respectively. In Example 42, the foam stabilizer was a blend of Surfactants H and L prepared by mixing 17 grams of each to provide a surfactant, designated herein as Surfactant Q, containing an average of about four 3-cyanopropylmethylsiloxy units. In Example 44, the foam stabilizer, designated herein as Surfactant R, had an average of ten 3-cyanopropylmethylsiloxy units and was prepared by the platinum-catalyzed hydrosilation of Polyether F of Table II employing a cyanopropylpolymethylsiloxane hydride in which the relative proportions of monomeric units was as given for Si—H Fluid VIII of Table I. Surfactant R, which has a viscosity of 1875 centistokes and a molecular weight (G.P.C.) of 26,800, is assigned the following average composition:

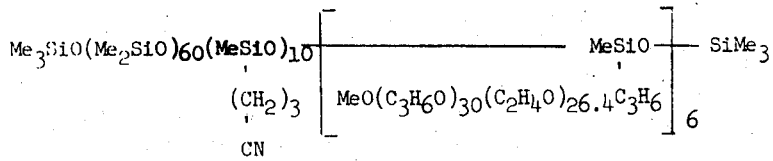

$$\text{Me}_3\text{SiO}(\text{Me}_2\text{SiO})_{60}(\text{MeSiO})_{10}\begin{array}{c}\\(\text{CH}_2)_3\\|\\\text{CN}\end{array}\left[\begin{array}{c}\text{MeSiO}\\|\\\text{MeO}(\text{C}_3\text{H}_6\text{O})_{30}(\text{C}_2\text{H}_4\text{O})_{26.4}\text{C}_3\text{H}_6\end{array}\right]_6\text{SiMe}_3$$

In preparing the foams of these examples and control Run C-5, the above-described general foaming procedure was followed and in each instance 0.5 part by weight of surfactant was used per 100 parts of polyether polyol reactant. The results are given in Table VI, wherein $y$ indicates the average number of 3-cyanopropylmethylsiloxy units contained in the surfactants.

The results of these examples are given in Table VIII below which also includes potency data (Run Nos. C-6 and C-7) based on the use of the above-described Surfactants AA and BB which are not surfactants of the invention. In each of Examples 45-48 and Runs C-6 and C-7, the above-described general foaming procedure was followed.

TABLE VI

| Example | — | 41 | 42 | 43 | 44 |
|---|---|---|---|---|---|
| Run No. | C-5 | — | — | — | — |
| Surfactant | *AA | L | Q | H | R |
| y | 0 | 3 | 4 | 5 | 10 |
| Rise, inches | 7.8 | 7.7 | 7.8 | 7.8 | 7.8 |
| Breathability, SCFM | 3.6 | 3.7 | 3.6 | 3.2 | 3.4 |
| Density, p.c.f. | 1.61 | 1.62 | 1.62 | 1.63 | 1.62 |
| Burning extent, inches | 4.3 | 3.0 | 2.68 | 2.6 | 2.1 |
| Burning time, seconds | 63 | 42 | 40 | 38 | 31 |

*Not a surfactant of the invention.

The data of Table VI show that Surfactants L, Q, H and R of the present invention provided self-extinguishing foams of lower burning extent than the foam produced with Surfactant AA in which silicon of the siloxane backbone is bonded only to methyl. The data also indicate that in order to provide foams of markedly reduced burning extents such as less than 3 inches, at least four to five 3-cyanopropylmethylsiloxy units is required. Surfactant R containing ten such units being particularly effective.

EXAMPLES 45–48

In accordance with these examples, a potency determination was made of surfactants of this invention employing Foam Formulation B having the following composition:

TABLE VIII

| Example | Surfactant | Concentration (p.h.p.) | Rise (inches) | Foam Breathability (SCFM) | Top Collapse (inches) |
|---|---|---|---|---|---|
| 45 | L | 0.6 | 11.1 | 5.1 | 0.9 |
| 46-1 | H | 1.0 | 12.1 | 1.6 | None |
| 46-2 | H | 0.6 | 11.5 | 2.1 | None |
| 47-1 | J | 1.0 | 11.6 | 1.4 | None |
| 47-2 | J | 0.6 | 11.2 | 2.1 | 0.4 |
| 48 | A | 1.0 | 10.2 | 2.8 | 0.6 |
| Run No. | | | | | |
| C-6 | *AA | 0.6 | 11.4 | 4.1 | 0.4 |
| C-7-1 | *BB+ | 1.0 | 9.7 | 4.2 | 1.5 |
| C-7-2 | *BB+ | 0.6 | 9.2 | 3.5 | 2.8 |

*Not a surfactant of the invention.
+Surfactant employed as 55 weight percent active solution.

TABLE VII

FOAM FORMULATION B

| Component | Parts By Weight | Grams |
|---|---|---|
| Polyether Polyol having a hydroxyl number of 46 produced by reacting glycerol, propylene oxide and ethylene oxide | 100 | 350 |
| Tolylene Diisocyanate (Index 105) /1/ | 57 | 199 |
| Water | 4.85 | 17.0 |
| Trichlorofluoromethane | 15 | 52.5 |
| Dimethylethanolamine | 0.35 | 1.2 |
| Stannous octoate | 0.3 | 0.84 ml. |
| Surfactant | Varied /2/ | |

/1/ The isocyanate employed was the same as that of Foam Formulation A and is identified in footnote /1/ of Table IV.
/2/ For specific proportions employed, refer to Table VIII herein.

The results of Table VIII show that Surfactants L, H, J and A containing an average of three, five, 10 and 20 3-cyanopropylmethylsiloxy units, respectively, exhibited potency properties superior to those of Surfactant BB in which phenylethyl groups are bonded to the siloxane backbone of the active polymer. Thus, in Run C-7-1 in which the concentration of active copolymer in Surfactant BB was 0.55 parts per 100 parts of polyol, the foam product exhibited a top collapse of 1.5 inches indicating more substantial settling of the foam than that observed for the foams produced in Examples 45, 46-2 and 47-2 in which Surfactants L, H and J were used at a concentration of 0.6 p.h.p.

EXAMPLES 49–50

In accordance with these examples, foams were stabilized with Surfactants F and N of the invention employing Foam Formulation A of Table IV except that: (a) the concentration of stannous octoate was 0.4 p.h.p. instead of 0.35; (b) the surfactant concentration was maintained constant at one p.h.p.; and (c) the concentration of the tris(2-chloroethyl)phosphate flame-retardant was varied (5, 7 and 10 p.h.p.). The results are given in Table IX which also includes data (Run Nos. C-8 and C-9) for foams stabilized with the above-described Surfactants AA and CC which are not within the scope of the invention. In the examples and Runs C-8 and C-9, the above-described general foaming procedure was followed.

EXAMPLE 51

The purpose of this example was to determine the affect of variation in surfactant concentration on burning extent and breathability of the resulting foams. The foams were produced using Foam Formulation A of Table IV except that the concentration of stannous octoate was 0.4 p.h.p. instead of 0.35. Surfactant F of the invention was employed at six different concentrations within the range from 0.4 to 1.4 p.h.p. The results are given in Table X which also sets forth a similar series of data (Run C-10) for foams stabilized with above-described comparative Surfactant CC. In producing the foams of Table X, the above-described general foaming procedure was followed.

TABLE X

| Example No. 51- | — | — | — | — | — | — | -1 | -2 | -3 | -4 | -5 | -6 |
|---|---|---|---|---|---|---|---|---|---|---|---|---|
| Run No. C-10- | -1 | -2 | -3 | -4 | -5 | -6 | — | — | — | — | — | — |
| Foam Formulation A /1/ | | | | | | | | | | | | |
| Stannous Octoate, p.h.p. | | | | 0.4 | | | | | | 0.4 | | |
| Surfactant | | | | *CC | | | | | | F | | |
| Pts. by Wt., p.h.p. | 0.4 | 0.6 | 0.8 | 1.0 | 1.2 | 1.4 | 0.4 | 0.6 | 0.8 | 1.0 | 1.2 | 1.4 |
| Breathability, SCFM | 5.5 | 5.2 | 5.0 | 5.0 | 3.2 | 3.0 | 3.2 | 3.8 | 3.8 | 3.4 | 3.2 | 2.6 |
| Burning Extent, inches | 2.8 | 3.5 | | >5 | | | 2.0 | 1.8 | 1.8 | 2.7 | 1.9 | 2.0 |

*Not a surfactant of the invention.
/1/ For other components, refer to Table IV herein.

The data of Table X further demonstrate the improved processing latitude of the surfactants of this invention as compared with Surfactant CC in that the foams produced with Surfactant F of the invention exhibited less change in burning extent and breathability with variation in surfactant concentration.

EXAMPLE 52

In accordance with this example, a series of foams were produced employing the above-described general

TABLE IX

| Example No. | — | — | — | — | — | — | 49-1 | 49-2 | 49-3 | 50-1 | 50-2 | 50-3 |
|---|---|---|---|---|---|---|---|---|---|---|---|---|
| Run No. | C-8-1 | C-8-2 | C-8-3 | C-9-1 | C-9-2 | C-9-3 | — | — | — | — | — | — |
| Foam Formulation A /1/ | | | | | | | | | | | | |
| Stannous octoate, p.h.p. | | | | | | | 0.4 | | | | | |
| Surfactant | | *AA /2/ | | | *CC | | | F | | | N | |
| Pts. by Wt., p.h.p. | | | | | | | 1.0 | | | | | |
| Flame-retardant, p.h.p. | 10 | 7 | 5 | 10 | 7 | 5 | 10 | 7 | 5 | 10 | 7 | 5 |
| Breathability, SCFM | 4.5 | 2.6 | 2.5 | 5.0 | 4.5 | 4.3 | 3.4 | 3.2 | 3.0 | 3.0 | 3.6 | 3.0 |
| Burning Extent, inches | >5.0 | >5.0 | | >5.0 | >5.0 | | 2.7 | 3.7 | >5.0 | 1.6 | 2.6 | >5.0 |

*Not a surfactant of the invention.
/1/ Other components are the same as in Table IV herein.
/2/ Employed in 55 weight percent active form.

The results of Table IX show that in using Surfactants F and N of the invention, there was less change in breathability with variation in flame-retardant concentration than observed for Surfactant AA, and that at 10 and 7 p.h.p. of flame-retardant and one part of foam stabilizer, Surfactants F and N allowed for the formation of foams of significantly lower burning extent than Surfactant CC.

foaming procedure and Foam Formulation A of Table IV herein, except that the surfactant concentration was maintained constant at one part per 100 parts of polyether polyol reactant and the stannous octoate concentration was varied from 0.30 to 0.50 p.h.p. The results are given in Table XI which, for the purpose of comparison, includes similar data as Run C-11 based on Surfactant CC.

TABLE XI

| Example No. 52- | — | — | — | — | — | −1 | −2 | −3 | −4 | −5 |
|---|---|---|---|---|---|---|---|---|---|---|
| Run No. C-11- | −1 | −2 | −3 | −4 | −5 | — | — | — | — | — |
| Foam Formulation A /1/ | | | | | | | | | | |
| Surfactant | | | *CC | | | | | F | | |
| Pts. by Wt., p.h.p. | | | 1.0 | | | | | 1.0 | | |
| Stannous octoate, p.h.p. | 0.30 | 0.35 | 0.40 | 0.45 | 0.50 | 0.30 | 0.35 | 0.40 | 0.45 | 0.50 |
| Breathability, SCFM | split | 5.5 | 5.0 | 4.0 | — | 6.0 | 5.2 | 3.4 | 3.0 | 2.8 |
| Burning Extent, inches | split | split | >5 | — | — | 2.3 | 2.6 | 2.7 | 2.2 | 2.0 |

*Not a surfactant of the invention.
/1/ For other components, refer to Table IV herein.

The data of Table XI illustrate that, from the standpoint of flammability properties, surfactants of this invention, as illustrated by Surfactant F, also have good "tin operating latitude." As shown, the flame-retarded, self-extinguishing foams produced with Surfactant F at different levels of stannous octoate concentration had low burning extents and were of satisfactory quality.

coal pigment tends to increase the flammability of foams produced therewith. The results are given in Table XIII which also includes similar data (Run Nos. C-12 and C-13) based on the above-described Surfactant CC which is not within the scope of the present invention. Each foam was formed following the above-described general foaming procedure.

TABLE XIII

| Example No. | — | — | 53-1 | 53-2 | — | — | — | 54-1 | 54-2 |
|---|---|---|---|---|---|---|---|---|---|
| Run No. | C-12-1 | C-12-2 | — | — | C-13-1 | C-13-2 | C-13-3 | — | — |
| Foam Formulation C /1/ | | | | | | | | | |
| Surfactant | | *CC | | F | | *CC | | | F |
| Stannous octoate, p.h.p. | 0.35 | 0.35 | 0.35 | 0.35 | 0.35 | 0.45 | 0.35 | 0.35 | 0.45 |
| Flame-retardant, p.h.p. | 10 | 20 | 10 | 30 | 10 | 20 | 20 | 10 | 20 |
| Charcoal pigment, p.h.p. | 0 | 0 | 0 | 0 | 7 | 7 | 7 | 7 | 7 |
| Cream time, seconds | 11 | 13 | 12 | 12 | 14 | 15 | 15 | 12 | 12 |
| Rise time, seconds | 79 | 89 | 79 | 89 | 87 | 96 | 86 | 82 | 83 |
| Flammability | | | | | | | | | |
| Rating | B | SE | SE | SE | B | — | SE | SE | SE |
| Burning extent, inches | 5.0 | 1.7 | 1.8 | 1.1 | 5.0 | — | 3.0 | 3.1 | 1.7 |
| Burning time, seconds | 125 | 46 | 39 | 20 | 105 | — | 77 | 56 | 48 |
| Remarks | — | — | — | — | — | split | — | — | — |

*Not a surfactant of the invention.
/1/ For other components, refer to Table XII.

EXAMPLES 53-54

In accordance with these examples, two series of foams were produced employing Surfactant F and a reaction mixture, referred to herein as Foam Formulation C, in which the polyether polyol reactant was a polyether polyol grafted with styrene and acrylonitrile. The composition of Foam Formulation C is given in the following Table XII.

TABLE XII

| FOAM FORMULATION C | |
|---|---|
| Component | Parts By Weight |
| Graft polymer/polyether polyol having a hydroxyl number of 45 /1/ | 100 |
| Tolylene Diisocyanate (Index 105) /2/ | 42.8 |
| Water | 3.5 |
| Bis[2-(N,N-dimethylamino)ethyl] ether employed as a 70 weight per cent solution in dipropylene glycol | 0.1 |
| Stannous Octoate | Varied /3/ |
| Tris(2-chloroethyl)phosphate | Varied /3/ |
| Charcoal Pigment | Varied /3/ |
| Surfactant | 1.0 |

/1/ This reactant is a graft copolymer of: a polyether polyol (80 parts) produced by reacting glycerol and propylene oxide to a hydroxyl number of 56; styrene (10 parts); and acrylonitrile (10 parts).
/2/ The isocyanate employed was the same as that of Foam Formulation A and is identified in footnote /1/ of Table IV.
/3/ For specific proportions employed refer to Table XIII herein.

A principal difference between these examples is that in Example 53 no charcoal pigment was employed whereas in Example 54 charcoal was a component of the foam formulation. Usually, the presence of char- The data of Table XIII illustrate that Surfactant F of the invention is an effective stabilizer of flame-retarded foams based on graft polymer/polyether polyols. The data also demonstrate that in Example 53-1, Surfactant F provided self-extinguishing foam of low burning extent (1.8 inches) at only 10 parts flame-retardant whereas at the same concentration of flame-retardant, Surfactant CC provided a foam in Run C-12-1 which did not qualify for a self-extinguishing rating. This improvement was also realized in providing foams containing charcoal pigment. Thus, the foam stabilized with Surfactant F in Example 54-1 had a burning extent of 3.1 inches as compared with 5.0 inches for the foam produced with Surfactant CC in Run C-13-1.

EXAMPLE 55

In accordance with this example, a series of flexible polyether-based urethane foams were produced employing Surfactant R (which is described above with particular reference to Example 44) as a 50 weight per cent solution in a butanol-started poly(oxyethylene-oxypropylene) mono-ol. The latter diluent has an average molecular weight of about 2900 and about 50 weight per cent of the oxyalkylene units are constituted of oxyethylene; based on these values, the diluent has the average composition, $C_4H_9(OC_3H_6)_u(OC_2H_4)_sOH$ wherein $u$ is about 24 and $s$ is about 32. This 50 per cent active solution of Surfactant R is designated herein as Surfactant R-1 and was employed to stabilize foams flame-retarded with the aforementioned flame-retardant Phosgard 2XC-20 which has the formula,

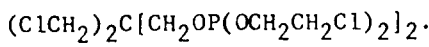

In addition to this flame-retardant and Surfactant R-1, the other components of the foam formulation employed in providing the series of foams of this example were: a polyether polyol having a hydroxyl number of 46 produced by reacting glycerol, propylene oxide and ethylene oxide (100 parts by weight); the tolylene diisocyanate reactant (48.36 p.h.p.) and amine catalyst (0.1 p.h.p.) employed in Foam Formulation A of Table IV herein; stannous octoate (0.25 and 0.325 p.h.p.); and water (4 p.h.p.). Following the general foaming procedure described above with reference to the other foam data herein, self-extinguishing (by ASTM D-1692-68) foams of particularly low burning extent were provided employing the aforesaid foam formulation containing 12.5 p.h.p. of the flame-retardant, and 1.0 and 0.5 p.h.p. of Surfactant R-1. Thus, at 0.325 p.h.p. of stannous octoate and 1.0 part of Surfactant R-1, the self-extinguishing foam product had a burning extent of 1.20 inches (extinguishing time = 21.75 seconds), and at 0.5 part, the burning extent of the foam was 1.18 inches (extinguishing time = 21.5 seconds). The breathability of the foams of these two runs were 0.6 and 1.05 SCFM, respectively. Foams of enhanced breathability were obtained at 0.25 p.h.p. stannous octoate. Thus, at this lower concentration of stannous octoate and employing Surfactant R-1 at 1.0 p.h.p. and 0.5 p.h.p., the respective self-extinguishing foam products had the following flammability and breathability properties: at 1.0 p.h.p., the burning extent was only 1.325 inches (extinguishing time = 23.5 seconds) and breathability was 2.1 SCFM; and at 0.5 p.h.p. of Surfactant R-1, the burning extent was also low, being 1.825 inches (extinguishing time = 30.0 seconds) and breathability was 2.7 SCFM.

We claim:

1. A process for producing flexible polyurethane foam which comprises reacting and foaming a reaction mixture comprising:
   a. a polyether polyol reactant containing an average of at least two hydroxyl groups per molecule,
   b. a polyisocyanate reactant containing at least two isocyanato groups per molecule,
   c. a blowing agent,
   d. a catalyst comprising an amine, and
   e. a foam stabilizer comprising a polysiloxanepolyoxyalkylene block copolymer having the average composition,

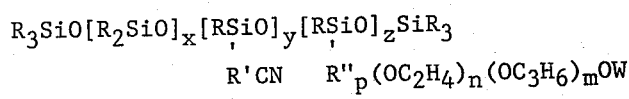

where
   R is an alkyl group having from 1 to 10 carbon atoms,
   R' has from 2 to 12 carbon atoms and is a bivalent alkylene or a bivalent oxyalkylene group the oxygen atom of which is bonded to silicon,
   R'' is an organic radical comprising a bivalent alkylene group a carbon atom of which is bonded to silicon,
   W comprises a monovalent hydrocarbyl group having from 1 to 12 carbon atoms,
   p has a value of zero or one,
   x has an average value from about 10 to about 200,
   y has an average value from 3 to about 100,
   z has an average value from about 2 to about 30,
   and the average values of m and n are such that the average molecular weight of the chain, $-(C_3H_6O)_m(C_2H_4O)_n-$, is from about 1000 to about 6000 and from about 20 to about 65 weight percent of the chain is constituted of oxyethylene units;

said reaction mixture containing from 0.8 to 1.5 equivalents of —NCO per equivalent of total active hydrogen contained in said mixture, and from about 0.1 to about 5 parts by weight of said block copolymer per one hundred parts by weight of said polyether polyol reactant (a).

2. A process as defined in claim 1 in which the reaction mixture contains a flame-retarding agent.

3. A flexible polyurethane foam produced in accordance with the method of claim 1.

4. A process for producing flexible polyurethane foam which comprises reacting and foaming a reaction mixture comprising:
   a. a polyether polyol reactant containing an average of at least two hydroxyl groups per molecule,
   b. a polyisocyanate reactant containing at least two isocyanato groups per molecule,
   c. a blowing agent comprising water,
   d. a catalyst comprising a tertiary-amine, and
   e. a foam stabilizer comprising a polysiloxanepolyoxyalkylene block copolymer having the average composition,

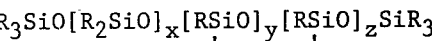
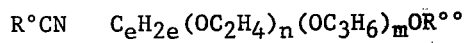

where
   R is alkyl having from one to four carbon atoms,
   R° is bivalent alkylene having from two to four carbon atoms,
   R°° is alkyl having from one to four carbon atoms,
   e has a value from two to four,
   x has an average value from about 20 to about 100,
   y has an average value from about 4 to about 30, and
   z an average value from about 2 to about 10, and
   m and n are positive numbers such that the average molecular weight of the chain, $-(OC_2H_4)_n(OC_3H_6)_m-$, is from about 1000 to about 6000 and from about 20 to about 65 weight percent of the chain is constituted of oxyethylene units;

said reaction mixture containing from 0.8 to 1.5 equivalents of —NCO per equivalent of total active hydrogen contained in said mixture, and from about 0.1 to about 5 parts by weight of said block copolymer per one hundred parts by weight of said polyether polyol reactant (a).

5. A process as defined in claim 4 in which —R°CN of said copolymer is cyanopropyl.

6. A process for producing flame-retarded, flexible polyurethane foam which comprises reacting and foaming a reaction mixture containing:

a. a polyether polyol reactant containing an average of at least two hydroxyl groups per molecule,
b. an organic polyisocyanate reactant containing at least two isocyanato groups per molecule,
c. water as a source of blowing action,
d. a catalyst comprising a tertiary-amine,
e. a co-catalyst comprising an organic derivative of tin,
f. a flame-retarding agent, and
g. a foam stabilizer comprising a polysiloxane-polyoxyalkylene block copolymer having the average composition,

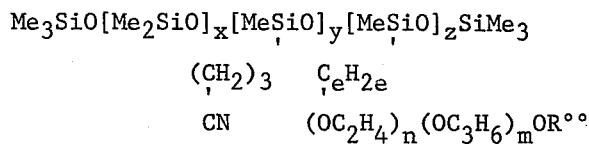

where
Me represents a methyl group,
$R^{\infty}$ represents a monovalent hydrocarbon group having from 1 to 12 carbon atoms,
$x$ has an average value from about 20 to about 100,
$y$ has an average value from about 3 to about 30,
$z$ has an average value from about 2 to about 10,
$e$ has a value from 2 to 6, and
$m$ and $n$ are positive numbers such that the average molecular weight of the chain, $-(C_3H_6O)_m(C_2H_4O)_n-$, is from about 1000 to about 6000 and from about 20 to about 65 weight per cent of the chain is constituted of oxyethylene units, and the average polysiloxane content of said block copolymer is from about 15 to about 45 weight percent, the remaining weight being constituted essentially of said $-(OC_2H_4)_n(OC_3H_6)_mOR^{\infty}$ blocks;
said reaction mixture containing from 0.8 to 1.5 equivalents of $-NCO$ per equivalent of total active hydrogen contained in said mixture, and from about 0.1 to about 5 parts by weight of said block copolymer per one hundred parts by weight of said polyether polyol reactant (a).

7. A flame-retarded, flexible polyurethane foam produced by the process of claim 6.

8. The process of claim 6 in which $R^{\infty}-$ of said copolymer is a lower alkyl group, $x$ has an average value from about 20 to about 100, $y$ has an average value from about 5 to about 20, and $z$ has an average value from about 2 to about 10.

9. The process of claim 6 in which said organic polyisocyanate reactant (b) comprises a tolylene diisocyanate and the reaction mixture contains from 0.9 to 1.1 equivalents of $-NCO$ per equivalent of active hydrogen in said mixture.

* * * * *

UNITED STATES PATENT OFFICE
CERTIFICATE OF CORRECTION

Patent No. 3,887,500     Dated June 3, 1975

Inventor(s) Bela Prokai and Bernard Kanner

It is certified that error appears in the above-identified patent and that said Letters Patent are hereby corrected as shown below:

Title Page, in the second line under "Related U.S. Application Data", for "3,846,402" read -- 3,846,462 --. Column 1, line 56, for "goot" read -- good --. Column 7, line 38, for "oxtyl" read -- octyl --. Column 8, line 17, after "aforesaid", delete "said". Column 12, line 57, the second occurrence of "-R'-" should read -- -R°- --. Column 20, lines 30-33, for the partially illegible print, read $$\begin{array}{cc} RSiO & RSiO \\ | & | \\ R°CN & OR°CN \end{array} \quad or$$

Column 21, line 9, for "$C_cH_2c13$", read -- $C_cH_2c-$ --. Column 22, line 5, that portion of the second ratio reading "::Z' " should read -- :z' --; line 7, for "ration" read -- ratio --. Column 23, line 16, for "such" read -- Such --. Column 28, line 50, for "oxygethylene" read -- oxyethylene --. Column 31, line 54, for "c." read -- C. --. Column 32, line 47, for "isoycanates" read -- isocyanates --. Column 33, line 14, for "2.4-" read -- 2,4- --; lines 49-50, for "triethylenedaimine" read -- triethylenediamine --. Column 37, line 35, for "Me3SiO-" read -- Me3SiO1/2- --; line 55, delete the first occurrence of "The" and substitute therefor -- source --. Column 38, line 35, for "VII" read -- VIII --. Columns 39-40, Table I, in the heading thereof, that portion of the formula reading $(CH_2)_2CN$   should read   $(CH_2)_3CN$

UNITED STATES PATENT OFFICE
CERTIFICATE OF CORRECTION

Patent No. 3,887,500    Dated June 3, 1975

Inventor(s) Bela Prokai and Bernard Kanner

It is certified that error appears in the above-identified patent and that said Letters Patent are hereby corrected as shown below:

Column 46, line 9, that portion of the formula reading $(Me_2SiO)_{50}$ should read $(Me_2SiO)_{50}$ Column 46, Table III, in the heading thereof, that portion of the formula reading $$\begin{array}{c} -MeSiO- \\ (CH_2)_3 \\ CN \end{array} \quad \text{should read} \quad \begin{array}{c} -MeSiO- \\ | \\ (CH_2)_3 \\ | \\ CN \end{array}$$

and that portion reading $$\begin{array}{c} -MeSiO- \\ C_3H_6 \end{array} \quad \text{should read} \quad \begin{array}{c} -MeSiO- \\ | \\ C_3H_6 \end{array}$$

Column 47, Table III-Continued, in the heading thereof, that portion of the formula reading $$\begin{array}{c} -MeSiO- \\ (CH_2)_3 \\ CN \end{array} \quad \text{should read} \quad \begin{array}{c} -MeSiO- \\ | \\ (CH_2)_3 \\ | \\ CN \end{array}$$

and that portion reading $$\begin{array}{c} -MeSiO- \\ C_3H_6 \end{array} \quad \text{should read} \quad \begin{array}{c} -MeSiO- \\ | \\ C_3H_6 \end{array}$$

UNITED STATES PATENT OFFICE
CERTIFICATE OF CORRECTION

Patent No. 3,887,500         Dated June 3, 1975

Inventor(s) Bela Prokai and Bernard Kanner

It is certified that error appears in the above-identified patent and that said Letters Patent are hereby corrected as shown below:

Column 48, line 33, for "polyoxylakylene" read -- polyoxyalkylene --. Column 50, line 52, for "weight 4are" read -- C-4 are --; line 56, for "weeight" read -- weight --; Table V, in the heading thereof, that portion of the formula reading $$(MeSiO)_y \quad \text{should read} \quad (Me\overset{|}{S}iO)_y$$
$$Y \quad\quad\quad\quad\quad\quad\quad\quad Y$$

and that portion reading $$\begin{array}{c}-MeSiO-\\ C_3H_6\end{array} \quad \text{should read} \quad \begin{array}{c}-Me\overset{|}{S}iO-\\ C_3H_6\end{array}$$

Column 51, Table V-Continued, in the heading thereof, that portion of the formula reading $$(MeSiO)_y \quad \text{should read} \quad (Me\overset{|}{S}iO)_y$$
$$Y \quad\quad\quad\quad\quad\quad\quad\quad Y$$

and that portion reading $$\begin{array}{c}-MeSiO-\\ C_3H_6\end{array} \quad \text{should read} \quad \begin{array}{c}-Me\overset{|}{S}iO-\\ C_3H_6\end{array}$$

Columns 55-56, Table X, opposite the left-hand legend reading "Burning Extent, inches" and under the third, fifth and sixth columns of numerical data, in each instance, read -- >5 --;

UNITED STATES PATENT OFFICE
CERTIFICATE OF CORRECTION

Patent No. 3,887,500         Dated June 3, 1975

Inventor(s) Bela Prokai and Bernard Kanner

It is certified that error appears in the above-identified patent and that said Letters Patent are hereby corrected as shown below:

Table IX, opposite the left-hand legend reading "Burning Extent, inches" and under each of columns headed "C-8-1", "C-8-3", "C-9-1" and "C-9-3", read -- >5.0 --. Columns 57-58, Table XI, opposite the left-hand legend reading "Burning Extent, inches" and under the second, fourth and fifth columns of numerical entries, in each instance, read -- >5 --. Column 60, lines 34-36, the formula should read $$R_3SiO[R_2SiO]_x[R\underset{|}{S}iO]_y[R\underset{|}{S}iO]_zSiR_3$$
$$R°CN \quad C_eH_{2e}(OC_2H_4)_n(OC_3H_6)_mOR°°$$

Column 60, line 46, after "z" insert -- has --. Column 61, lines 14-19, the formula should read $$Me_3SiO[Me_2SiO]_x[Me\underset{|}{S}iO]_y[Me\underset{|}{S}iO]_zSiMe_3$$
$$(\underset{|}{C}H_2)_3 \quad \underset{|}{C}_eH_{2e}$$
$$CN \quad (OC_2H_4)_n(OC_3H_6)_mOR°°$$

Signed and Sealed this

Twenty-first Day of June 1977

[SEAL]

Attest:

RUTH C. MASON
Attesting Officer

C. MARSHALL DANN
Commissioner of Patents and Trademarks